United States Patent
Forbes

(10) Patent No.: US 11,804,712 B2
(45) Date of Patent: Oct. 31, 2023

(54) SYSTEMS AND METHODS FOR IMPROVING LOAD ENERGY FORECASTING IN THE PRESENCE OF DISTRIBUTED ENERGY RESOURCES

(71) Applicant: THE CATHOLIC UNIVERSITY OF AMERICA, Washington, DC (US)

(72) Inventor: Kevin F. Forbes, Silver Spring, MD (US)

(73) Assignee: THE CATHOLIC UNIVERSITY OF AMERICA, Washington, DC (US)

( * ) Notice: Subject to any disclaimer, the term of this patent is extended or adjusted under 35 U.S.C. 154(b) by 134 days.

(21) Appl. No.: 17/230,201

(22) Filed: Apr. 14, 2021

(65) Prior Publication Data
US 2021/0320495 A1    Oct. 14, 2021

Related U.S. Application Data

(60) Provisional application No. 63/009,650, filed on Apr. 14, 2020.

(51) Int. Cl.
*H02J 3/00* (2006.01)
*G05B 17/02* (2006.01)
(Continued)

(52) U.S. Cl.
CPC .............. *H02J 3/003* (2020.01); *G05B 17/02* (2013.01); *G06F 16/27* (2019.01); *H02J 3/004* (2020.01);
(Continued)

(58) Field of Classification Search
CPC .. H02J 3/003; H02J 3/004; H02J 3/381; H02J 2203/20; H02J 2300/24; H02J 2300/28;
(Continued)

(56) References Cited

U.S. PATENT DOCUMENTS

| 4,841,925 A | 6/1989 | Ward |
| 5,974,403 A | 10/1999 | Takriti et al. |

(Continued)

FOREIGN PATENT DOCUMENTS

| WO | 2019/005412 A1 | 1/2019 | |
| WO | WO-2019005412 A1 * | 1/2019 | ........... G05B 19/042 |

OTHER PUBLICATIONS

Zhang Z. Multivariable fractional polynomial method for regression model. Ann Transl Med. May 2016;4(9):174. doi: 10.21037/atm.2016.05.01. PMID: 27275487; PMCID: PMC4876277. (Year: 2016).*

(Continued)

*Primary Examiner* — Mohammad Ali
*Assistant Examiner* — Dhruvkumar Patel
(74) *Attorney, Agent, or Firm* — Amster, Rothstein & Ebenstein LLP

(57) ABSTRACT

Systems and methods for improving load energy forecasting in the presence of distributed energy resources in which a revised load forecast is calculated based on forecasted meteorological conditions data, forecasted wind and solar energy, forecasted load data, time data and time-series variables determined based on an analysis of the historical data. In exemplary embodiments, the revised load forecast is provided to energy management computer systems to enable appropriate levels of generation of conventional and renewable energy generation within the electric power grid.

10 Claims, 24 Drawing Sheets

(51) Int. Cl.
*G06F 16/27* (2019.01)
*H02J 3/38* (2006.01)

(52) U.S. Cl.
CPC ........... *H02J 3/381* (2013.01); *H02J 2203/20* (2020.01); *H02J 2300/24* (2020.01); *H02J 2300/28* (2020.01)

(58) Field of Classification Search
CPC ...... H02J 2203/10; G05B 17/02; G06F 16/27; G06F 16/2477; Y02E 60/00; Y02E 10/56; Y04S 10/50; Y04S 40/20; Y04S 50/14; G06Q 30/0202; G06Q 50/06; Y02A 30/00
See application file for complete search history.

(56) References Cited

U.S. PATENT DOCUMENTS

| | | | |
|---|---|---|---|
| 6,032,125 | A | 2/2000 | Ando |
| 6,673,479 | B2 | 1/2004 | McArthur et al. |
| 7,141,321 | B2 | 11/2006 | McArthur |
| 8,583,470 | B1 | 11/2013 | Fine et al. |
| 8,600,572 | B2 | 12/2013 | Sri-Jayantha |
| 8,620,634 | B2 | 12/2013 | Foslien Graber et al. |
| 2003/0182250 | A1 | 9/2003 | Shihidehpour et al. |
| 2003/0200134 | A1 | 10/2003 | Leonard et al. |
| 2004/0110044 | A1 | 6/2004 | McArthur et al. |
| 2007/0156510 | A1 | 7/2007 | Kim et al. |
| 2008/0033786 | A1 | 2/2008 | Boaz et al. |
| 2008/0195255 | A1 | 8/2008 | Lutze et al. |
| 2009/0093916 | A1 | 4/2009 | Parsonnet et al. |
| 2010/0100250 | A1 | 4/2010 | Budhraja et al. |
| 2010/0169165 | A1 | 7/2010 | Bateni et al. |
| 2010/0257133 | A1 | 10/2010 | Crowe et al. |
| 2010/0292856 | A1 | 11/2010 | Fujita |
| 2011/0153386 | A1 | 6/2011 | Kim et al. |
| 2011/0307109 | A1 | 12/2011 | Sri-Jayantha |
| 2012/0253532 | A1* | 10/2012 | McMullin ............... G06Q 50/06 700/291 |
| 2013/0096983 | A1 | 4/2013 | Forbes et al. |
| 2014/0278107 | A1 | 9/2014 | Kerrigan et al. |
| 2015/0015404 | A1 | 1/2015 | Dom |
| 2015/0186904 | A1 | 7/2015 | Guha et al. |
| 2016/0033986 | A1 | 2/2016 | Kamel et al. |
| 2016/0246272 | A1* | 8/2016 | Srivastava ............. G06Q 50/06 |
| 2017/0124666 | A1 | 5/2017 | Hazra et al. |
| 2017/0131435 | A1 | 5/2017 | Peacock et al. |
| 2017/0317495 | A1* | 11/2017 | Pavlovski ................. H02J 3/06 |
| 2018/0060738 | A1 | 3/2018 | Achin et al. |
| 2019/0067946 | A1* | 2/2019 | Pan ........................ G06Q 50/06 |
| 2019/0303783 | A1 | 10/2019 | Utsumi et al. |

OTHER PUBLICATIONS

Sauerbrei, W., Perperoglou, A., Schmid, M. et al. State of the art in selection of variables and functional forms in multivariable analysis—outstanding issues. Diagn Progn Res 4, 3 (2020). https://doi.org/10.1186/s41512-020-00074-3 (Year: 2020).*
Paul Denholm et al., "Overgeneration from Solar Energy in California: A Field Guide to the Duck Chart," National Renewable Energy Laboratory, NREL/TP-6A20-65023 (2015). Available at https://www.nrel.gov/docs/fy16osti/65023.pdf. (Accessed Jul. 13, 2021).
G. E. P. Box and D. R. Cox, "An analysis of transformations," Journal of the Royal Statistical Society, Series B, vol. 26, No. 2 (1964), pp. 211-252.
G. E. P. Box et al., "Statistics for Experimenters, 2nd Edition," John Wiley & Sons, Inc., 2005.
California ISO, "Briefing on renewables and recent grid operations," 2018, <online> https://www.caiso.com/Documents/Briefing_Renewables_RecentGridOperations-Presentation-Mar2018.pdf (Accessed Jul. 13, 2021).
Federal Energy Regulatory Commission, "Uplift in RTO and ISO Markets," Aug. 2014, <online> https://www.ferc.gov/sites/default/files/2020-05/08-13-14-uplift_2.pdf (Accessed Jul. 13, 2021).
Kevin F. Forbes and Ernest M. Zampelli, "Wind energy, the price of carbon allowances, and CO2 emissions: Evidence from Ireland," Energy Policy, vol. 133, 2019, Elsevier.
Kevin F. Forbes and Ernest M. Zampelli, Do Day-Ahead Electricity Prices Reflect Economic Fundamentals ?: Evidence from the California ISO, The Energy Journal, vol. 35 No. 3, pp. 129-144, 2014.
Pieter Gagnon et al., "Rooftop Solar Photovoltaic Technical Potential in the United States: A Detailed Assessment," National Renewable Energy Laboratory, Technical Report (NREL/TP-6A20-65298), Jan. 2016.
Nerc, "Distributed Energy Resources Task Force Report," Feb. 2017. Available at: https://www.nerc.com/comm/Other/essntlrlbltysrvcstskfrcDL/Distributed_Energy_Resources_Report.pdf (Accessed Jun. 30, 2019).
New York Independent System Operator, "Solar Impact on Grid Operations—An Initial Assessment," Jun. 30, 2016. Available at: https://www.nyiso.com/documents/20142/1394495/Solar%20Integration%20Study%20Report%20Final%20063016.pdf/8fcbce3c-7be3-6b01-54d3-0887b9633969 (Accessed Jun. 30, 2019).
New York Independent System Operator, "Power Trends 2019: Reliability and the Greener Grid," 2019. Available at: https://www.nyiso.com/documents/20142/2223020/2019-Power-Trends-Report.pdf/0e8d65ee-820c-a718-452c-6c59b2d4818b (Accessed Jun. 30, 2019).
New York Independent System Operator (2019). NYISO Performance Metrics: Q4 2018. Available at https://www.nyiso.com/documents/20142/2244158/Q4-Quarterly-Metrics-report.pdf/9d563013-52ce-8854-7a9c-33744d2d9da9 (Accessed Jun. 30, 2019).
Potomac Economics, "2016 State of the Market Report for the New York ISO Markets," May 2017. Available at https://www.potomaceconomics.com/wp-content/uploads/2017/05/NYISO_2016_SOM_Report_5-10-2017.pdf (Accessed Jul. 13, 2021).
Potomac Economics, "2018 State of the Market Report for the New York ISO Markets," Available at https://www.potomaceconomics.com/wp-content/uploads/2019/05/NYISO-2018-SOM-Report Full-Report_5-8-2019_Final.pdf (Accessed Jul. 13, 2021).
Patrick Royston and Willi Sauerbrei, "Multivariable model-building: A pragmatic approach to regression analysis based on fractional polynomials for modelling continuous variables," Wiley series in probability and statistics, 2008.
Tatsuya Shinkawa, "Electricity System and Market in Japan," Electricity and Gas Market Surveillance Commission, Jan. 22, 2018. Available at https://www.emsc.meti.go.jp/english/info/public/pdf/180122.pdf (Accessed Jun. 30, 2019).
Jung et al. "Current status and future advances for wind speed and power forecasting." Renewable and Sustainable Energy Reviews, vol. 31, Mar. 2014, pp. 762-777, Elsevier Ltd.
Foley et al. "Current methods and advances in forecasting of wind power generation." Renewable Energy, vol. 37, Issue 1, Jan. 2012 , pp. 1-22, Retrieved on Jul. 16, 2021 from <https://cora.ucc.ie/bitstream/handle/10468/1735/Foley.wind.forecasting.review.ver.4.CORA.pdf?sequence=1&isAllowed=y> entire document.
S. Jebaraja and S. Iniyanb, "A review of energy models," Renewable and Sustainable Energy Reviews vol. 10, Issue 4, Aug. 2006, pp. 281-311.
Tinghui Ouyang et al., "Modeling and Forecasting Short-Term Power Load With Copula Model and Deep Belief Network," in IEEE Transactions on Emerging Topics in Computational Intelligence, vol. 3, No. 2, pp. 127-136, Apr. 2019.
Kevin F. Forbes and Ernest M. Zampelli, "The Accuracy of Wind Energy Forecasts and Prospects for Improvement," 2017 14th International Conference on the European Energy Market (EEM), Dresden, Jul. 17, 2017, pp. 1-6 (Year: 2017).
Hamidreza Zareipour, "Price Forecasting and Optimal Operation of Wholesale Customers in a Competitive Electricity Market," 2007. University of Waterloo (Canada). [retrieved from the Internet on Jul. 14, 2021.] < https://uwspace.uwaterloo.ca/bitstream/handle/10012/2611/Hamid_Zareipour_Thesis.pdf> entire document.
Elia, "Forecast and Actual Solar-PV Power Generation," Version V1.1, Apr. 15, 2017, 4 pages.

(56) References Cited

OTHER PUBLICATIONS

Harvey, A. C., "Dynamic models for volatility and heavy tails: With applications to financial and economic time series," 2013, p. 20, New York: Cambridge University Press. https://doi.org/10.1017/CBO9781139540933.

European Patent Office, "Extended European Search Report," issued in European Patent Application No. 17 800 253.1, which is a counterpart to U.S. Appl. No. 17/230,201, dated Dec. 18, 2019, 11 pages.

International Search Report received for PCT Patent Application No. PCT/US2021/027226, dated Jul. 8, 2021, 9 pages.

International Search Report received for PCT Patent Application No. PCT/US2017/033577, dated Aug. 2, 2017, 21 pages.

International Search Report received for PCT Patent Application No. PCT/US2012/032062, dated Jul. 16, 2012, 10 pages.

Kevin F. Forbes, ScienceDirect, Utilities Policy, "Demand for grid-supplied electricity in the presence of distributed solar energy resources: Evidence from New York City" (2023).

Kevin F. Forbes, Ph.D., An Econometric Model to Improve the Predictability of System Operator Coordinated Load in Great Britain (Jul. 2021).

\* cited by examiner

SYSTEMS AND METHODS FOR IMPROVING LOAD ENERGY FORECASTING IN THE PRESENCE OF DISTRIBUTED ENERGY RESOURCES

RELATED APPLICATIONS

This application claims priority to and the benefit of U.S. Provisional Application No. 63/009,650, filed Apr. 14, 2020 and entitled SYSTEMS AND METHODS FOR IMPROVING LOAD ENERGY FORECASTING IN THE PRESENCE OF DISTRIBUTED ENERGY RESOURCES, the contents of which are incorporated herein by reference in their entirety.

FIELD OF THE INVENTION

The present invention generally relates to computer systems and methods for improving the operation and efficiency of electric utility grids based on more accurate load energy forecasting, and/or computer systems and methods for refining such forecasting.

BACKGROUND

The increasing utilization of distributed energy resources (DERs) such as rooftop solar has brought about environmental benefits but has also reduced the accuracy of the load forecasts that system operators use to optimize the resources of the power grid. One consequence of this is the so-call "Duck curve," which was first documented in California where the output of solar energy gives rise to a net load profile that looks like a duck. This profile is believed to pose a significant technological challenge to system operators. Other regions vulnerable to this challenge include, by way of illustration, the New York City electricity zone, a region in which the load forecast errors can have significant consequences for the cost of balancing electricity supply with demand because of the congestion in the transmission lines that feed into NYC from upstate New York. Other regions, both in the United States and in other countries, are also vulnerable to the "Duck curve" phenomenon.

The "Duck Curve" phenomenon is believed to represent a significant operational challenge to system operators because of the associated reduced accuracy of the forecasts that system operator computer systems use to optimize the resources of the power grid. As mentioned, the "Duck curve" was first documented in California, where the output of solar energy reduces mid-day utility-supplied demand, with a steep ramp-up in utility-supplied demand later in the day as solar radiation diminishes. FIG. 1 is a chart of hour vs. megawatts during a typical spring day showing the "Duck Curve" phenomenon. Denholm et al (2015, p. 3) have suggested that the "belly" portion of the curve could result in overgeneration and a subsequent excessive level of curtailed renewable energy. In their view, a shift in operating procedures, including the establishment of full visibility and control of distributed energy resources by the system operator and associated computer system is required. (Denholm et al., 2015, p. 36). Technological challenges associated with existing computer systems and grid networks have proven formidable.

Other technical challenges raised by the Duck curve relate to the neck of the duck, i.e., the steep ramp-up in utility generation late in the day. The ramp in net load may be a significant concern because of generation ramping constraints and the uncertainty of the required ramp. Consistent with this view, CAISO (2018) has reported that "One of the biggest challenges during low minimum netload [days] is the capability to commit internal resources to meet the evening ramp and other AS [Ancillary Services] requirements" (CAISO, 2018, p. 8). CAISO has further noted that "Ramps are increasing and present a risk going forward if sufficient ramping capability does not exist" (CAISO, 2018, p. 9). It has also concluded that it cannot rely on wind energy or imports to meet ramps (CAISO, 2018, p. 12). Technological challenges associated with these ramps have also proven formidable for existing computer systems and grid networks.

Combined Cycle Gas Turbines (CCGT) require about one hour to reach full capacity from a cold start. Open Cycle Gas Turbines (OCGT) and diesel generators are highly flexible but have emission rates that are significantly higher than CCGT. Neither ramping constraints nor direct emissions are an issue with respect to energy withdrawn from battery storage, but cost and other considerations may be relevant. Consistent with this view, the data from CAISO indicates that the maximum five-minute withdraw from battery storage was a mere 126 MW over the period 10 Apr. 2018 through 20 Jun. 2019 (http://www.caiso.com/TodaysOutlook/Pages/supply.aspx). To put this value in perspective, some of the one-hour ramps that CAISO has had to accommodate are over 7,000 MW in magnitude (CAISO, 2018, p. 10).

Concerning uncertainty, the solar energy data from Elia, the system operator in Belgium, may be instructive (http://www.elia.be/en/grid-data/power-generation/Solar-power-generation-data/Graph). This data has the advantage of being reported at the sub-hourly level. Moreover, the reported forecast data are updated four times each day (Elia, 2017). FIG. 2 is a chart of forecasted vs. actual solar energy in Belgium, 1 Jan. 2017-31 Dec. 2018, indicating that the errors in the forecasts are quite large. Specifically, the weighted-mean-absolute-percentage-error (WMAPE) during daylight hours equals 11.29%. The WMAPE can be computed using the following formula:

$$WMAPE = \frac{\frac{1}{T}\sum_{t=1}^{T} |Actual_t - Forecast_t|}{\frac{1}{T}\sum_{t=1}^{T} Actual_t} * 100\%.$$

Based on data from Elia, 11.29% is about six times the WMAPE associated with the day-ahead load forecast over the same period. Accordingly, traditional approaches to forecasting solar energy have large errors. Consistent with this view, Elia, the system operator in Belgium has called for more accurate forecasts. See, for example, https://innovation.eliagroup.eu/projects/open-innovation-challenge-2018-for-startups/. Yet, at this time, Elia has been unable to find a low cost solution to its forecasting challenges.

The Duck curve phenomenon is not limited to California. An illustration of the challenge it poses is the almost perfect correlation between the solar energy imbalance and the electricity imbalance in the Kyushu area of Japan, as shown in FIG. 3. This relationship is also visually apparent in the Tokyo area (Shinkawa, 2018, p. 31).

The New York City network also has relatively high incidence of large real-time electricity price spikes in New York City, the New York Independent System Operator's (NYISO) largest zone in terms of electricity consumption.

FIG. 4 is a chart of real-time vs. Day-Ahead Zonal Prices in NYISO's NYC Zone, 1 Jan. 2017-31 Dec. 2018, showing that there are market periods in which the real-time price of electricity is more than ten times the day-ahead price for the same hour. These price spikes represent instances in which the reliability of the electric power system was significantly challenged, given that it would not be prudent for a system operator to pay substantially more than the day-ahead price for electricity unless reliability was under challenge. The price spikes occur because system operators are unable to make accurate predictions of future operating conditions, making it a key element in maintaining reliability. Thus, technical challenges with existing computer systems and networks continue to persist.

Concerning solar energy, as of 31 Mar. 2019, about 1,800 MW (DC) of solar PV installations were located in New York State (https://www.nyserda.ny.Rov/About/Tracking-Progress/Statewide-Completed-Solar-Projects). A study by the United States National Renewable Energy Laboratory (NREL) has reported that New York State has the potential to install about 46 GW of rooftop solar PV systems. The capacity could produce about 55 TWh of annual energy generation (Gagnon et al., 2016, Table 6). The study concluded that NYC had a solar energy potential of 8.6 GWh. The associated annual production is about 10.74 GWh per year, the highest for any city in the United States (Gagnon et al., 2016, p 18). NYISO has reported that it can reliably manage up to 4,500 MW of wind and 9,000 MW of solar PV provided that a sufficient amount of transmission capacity is installed (NYISO, 2016, p iii). It believes that higher penetration levels may be possible.

Despite its optimism in terms of the feasibility of 9,000 MW of solar PV, NYISO appears to be aware of the challenge posed by the Duck curve. In its words, "Tremendous change is taking place in consumers' adoption of Distributed Energy Resources (DER) to supply a portion of their energy needs. DERs displace energy that was traditionally supplied by the bulk power system, contributing to declining load on the grid, but adding complexity to operations, market design efforts, and system planning needs. This complexity arises because shifting load from the bulk power system to local DERs is not the same as eliminating load. When those resources are not producing energy, the bulk power system must still provide energy to those homes and businesses. As a result, planning for the reliable operation of the power system as a whole must consider total expected consumption of energy, including energy provided by the DERs." (NYISO, 2019, p. 9)

Thus, existing networks and computer systems continued to suffer technological challenges.

Moreover, system operators have the obligation to reliably provide energy to homes and businesses at a reasonable price when meteorological conditions do not favor the provision of DERS. That electricity will not be consumed by those consumers when meteorological conditions are favorable. As a result, DERs have the potential to pose a challenge to reliability because forecasting meteorological conditions is imperfect. Thus, existing networks and computer systems continue to suffer further technological challenges.

The North American Reliability Corporation (NERC), the not-for-profit organization in North America charged with establishing reliability standards, is also aware of the challenge posed by DERs:

"Today, the effect of aggregated DER is not fully represented in BPS [bulk power system] models and operating tools. This could result in unanticipated power flows and increased demand forecast errors. An unexpected loss of aggregated DER could also cause frequency and voltage instability at sufficient DER penetrations. Variable output from DER can contribute to ramping and system balancing challenges for system operators whom typically do not have control or observability of the DER within the BPS." (NERC, 2017, p. vi)

In short, DERs, as illustrated by the Duck curve, pose technological challenges to reliability because of the reduced accuracy of the forecasts for grid-supplied electricity. To appreciate the magnitude of this technological challenge, the day-ahead load forecasts for NYC were evaluated over the period 1 Jan. 2017 through 31 Dec. 2018. With a persistence forecast as a reference, the mean-squared-error-skill-score (MSESS) of the forecast is 0.1697. This value indicates that NYISO's day-ahead forecast is superior to a persistence forecast that projects the level of electricity consumption in period t to be equal to the consumption level in period t−1 (under this metric, a forecast equivalent to a persistence forecast would have an MSESS equal to zero). The WMAPE of NYISO's forecast for NYC over this period is 2.44% of the mean level of load. These metrics indicate a seemingly respectable level of forecasting performance. However, close inspection of the data indicates that there are instances in which the forecast error exceeds 1,000 MWh. This is shown in FIG. 5 which is a graph of grid supplied load and the day-ahead forecasted load for New York City, 1 Jan. 2017-31 Dec. 2018.

If one defines the forecast error as the actual load minus forecasted load, it is reasonably clear that the real-time electricity market in NYC has an asymmetric response to the forecast errors. This is shown in FIG. 6 which is a graph of error in the load forecast and the real-time/day-ahead price difference for NYC, 1 Jan. 2017-31 Dec. 2018. Specifically, there is little apparent systematic response to negative errors, but positive errors, i.e., actual load exceeding day-ahead forecasted load, are associated with significant differences between the real-time and day-ahead prices. On average, the real-time price exceeded the day-ahead price by about $2.31 per MWh over all of the hours in which the actual load exceeded forecasted load. In 120 of these hours, the price differential exceeded $100 per MWh. The price differential was larger than $500 per MWh in 6 hours and over $1,000 per MWh in 2 hours. In short, while the WMAPE in the day-ahead forecasts of load in NYC suggests that the forecasts are accurate, the relationship between the price spikes and load forecast errors in FIG. 6 indicates that forecasts are not sufficiently accurate. The data presented in FIG. 6 actually understates matters because the system operator sometimes makes payments to generators outside the real-time market framework (FERC, 2014). NYISO concedes that these payments are driven by load forecast errors. In its words, "Because actual demand for electricity cannot be perfectly predicted, out-of-markets costs (known as "uplift") are sometimes incurred in order to maintain reliable operation of the grid." (NYISO, 2018, p. 6). The 2018 uplift payments directly associated with activities in NYC equaled USD$43 million; in 2016, the payments corresponding to NYC were USD$12 million (Potomac Economics, 2019, p. 101; 2017, p. 90).

While the day-ahead load forecasts for NYC are seemingly accurate, the visually apparent relationship between the forecast errors and the incidence of the real-time price spikes depicted in FIG. 6 indicates that there is room for improvement. The trend in installations of roof-top solar, while conveying environmental benefits, also pose significant technological challenges to existing networks and computer systems.

The operating model of the electric power industry is in the process of being radically transformed by the integration of solar and wind energy either being produced directly by consumers (e.g., rooftop solar) or injected directly into the distribution system. Indeed, this transformation can be seen by comparing FIGS. 7 and 8. FIG. 7 shows the conventional model of the electric power industry, in which the system operator coordinates generation and transmission based on its forecasts of electricity consumption at the industry's distribution stage. FIG. 8 shows the new emerging model of the electric power industry, in which the system operator needs to coordinate generation and transmission based on its forecasts of electricity consumption minus the level of generation injected into the distribution system and/or directly produced by prosumers. This can pose technological challenges because the system operator may only have limited information and control over these suppliers.

Indeed, Elia, the system operator in Belgium tries to ensure that its forecasts and the corresponding measurements reflect the latest situation with regard to installed solar-PV power capacity in the Belgian control area. However, according to Elia, it can only show forecasts and measurements for monitored capacity for which it has detailed background information. This is yet another technological challenge of existing networks and systems.

Moreover, the system operator does not have adequate data on the production levels. According, to Elia, production data are always obtained from an estimate based on an extrapolation, since it (Elia) does not have all the measurement data at its disposal. An indicator of this technological challenge, the error in the solar and wind energy forecasts for energy in Belgium destined to be injected into the distribution system is a nontrivial 10.7%

Generating accurate load forecasts is important for many technological reasons in the context of electric power grids that integrate renewable energy resources. "Keeping the lights on" requires adherence to fairly stringent stability conditions in terms of system frequency, e.g., the level of voltage and current oscillations each second. System frequency falls (rises) when demand exceeds (or is less than) supply. System frequency in Great Britain varies around the target of 50 Hz with National Grid ESO, the system operator in Great Britain, is obligated to keep system frequency within 1% of the 50 Hz target, i.e., +/−0.50 Hz (United Kingdom Electricity Safety, Quality and Continuity Regulations, 2002, p 14). Deviations within the band +/−0.20 Hz are considered normal. Violations of the operational limits +/−0.20 Hz do occur, as shown in FIG. 9, which is a graph of system frequency in Great Britain's power grid, 1 Dec.-31 Dec. 2013. These violations pose a risk to equipment and the overall reliability of the electric power system. When a large and sustained violation occurs, generators and other equipment connected to the transmission system may be automatically disconnected to prevent equipment damage, which in turn could result in an electricity blackout. An example of this risk was when a transmission line "tripped," i.e., automatically disconnected itself from the transmission system to prevent damage at about 17:15 local time on 9 Nov. 1965 in the province of Ontario Canada. This adversely affected system frequency in New York State which led to generators going offline which in turn induced further declines in system frequency. By about 17:28 local time, system frequency was 11 Hz below its target (Federal Power Commission, 1967, p. 49). The electric power system in the northeast United States and Canada was largely unable to cope and by 17:30 local time, about 30 million individuals lost power (Federal Power Commission, 1967, p. 17).

Errors in electricity load forecasts and the failure/inability of suppliers to adhere to their generation and transmission schedules are the root causes of the variability in system frequency. Current systems are technologically challenged to address and remedy these errors. Based on half-hour data for the period 2012 through 2013 obtained from EnAppSys, a firm that provides access to power grid data (https://www.netareports.com), National Grid ESO attempts to offset this by dispatching balancing power, supplied largely by combined-cycle gas turbines (CCGT) and coal-fired power stations. A key measure of the electricity imbalance during a 30-minute settlement period in Great Britain is known as the net imbalance volume (NIV). NIV equals the sum of all energy deployments initiated by National Grid ESO to balance the system during the settlement period. Positive (negative) NIV values indicate a shortage (surplus). Large NIV outcomes in absolute value represent instances in which the reliability of the system is challenged. Large positive NIV values are especially problematic as most conventional generating technologies require non-negligible response times when additional generation is needed. Over the period 11 Mar. 2003, the day that NIV values were first reported, through 31 Dec. 2019, the average level of NIV was negative, but very volatile from one market period to the next, as shown in FIG. 10, which is a graph of net energy imbalance in the power grid that serves Great Britain during that time period. Observe also that large positive NIV values are more likely in the more recent years than in the past. Indicative of this, there were 62 instances of NIV>1,000 MWh in 2006/2007, the first two full years after the integration of Scotland into the trading arrangements; in 2018/2019, there were 120 cases. Moreover, the largest ever positive NIV outcome of approximately 2,472 MWh occurred in 2018. Consistent with this view of the trend in balancing actions, the activated level of upward generation frequency containment reserves (FCR), i.e. generation reserves dispatched upward to prevent system frequency from falling below its lower operational limit of 49.80 Hz or to restore frequency to within the operational limits if below that level, was considerably higher in 2019 than 2015, the earliest year for which we have this data). This is shown in FIG. 11, which is a graph of the activation of upward frequency containment generation reserves in the power grid that serves Great Britain, 1 Jan. 2015-31 Dec. 2019. This is visually clear for the peak levels of activation (3,144 MWh in 2019 vs. 1,496 MWh in 2015).

While the level of balancing activity in the British power grid has increased, the performance of its balancing system has significantly declined in recent years. Indicative of this, analysis of the one-second system frequency data from National Grid (https://www.nationalgrideso.com/balancing-services/frequency-response-services/historic-frequency-data) indicates that the incidence of violations of the operational limits, measured in seconds, has increased significantly since 2014. This is shown in FIG. 12, which is a graph of the number of violations of the system frequency operational limits in Great Britain, 2014-2019. Specifically, the number of seconds outside the 49.8-50.20 Hz range was 30,213 seconds in 2019 as opposed 14,370 seconds in 2014.

While the number of violations of the operational limits was lower in 2019 as compared to 2018, 2019 was the first time since 2014 in which the statutory limits were violated, as shown in FIG. 13, which is a graph of system frequency in Great Britain, 1 Jan.-31 Dec. 2019. The violation, which occurred on 9 Aug. 2019, was precipitated by a lightning strike. There was an immediate loss of about 150 MW of embedded generation (generation connected to the distribution system as opposed to the high voltage transmission system). There was also a loss of about 980 MW in generation from an offshore wind farm and a gas-fired generating station. According to National Grid ESO, these sources of generation are not expected to be de-loaded or tripped off in response to a lightning strike (National Grid ESO, 2019c, p. 4). These losses triggered the further loss of another 350 MW of embedded generation. System frequency plunged outside the normal range but then began to recover as balancing power was dispatched. Unfortunately, there was a further trip at the gas-fired generating station and system frequency decreased to 48.8 Hz (National Grid ESO, 2019c, p. 5). At that point, the automatic secondary backup system disconnected approximately 5% of electricity demand. Approximately 1 million customers lost power.

National Grid ESO's subsequent analysis of the 9 Aug. 2019 event indicates that the system should have been able to withstand the loss in generation if the loss in generation had been less extreme (National Grid ESO, 2019c, p. 4). One possibility, not explored in the National Grid ESO report, is that the reserve power needed to maintain stability was already being dispatched to resolve the operating challenges associated the errors in the load and/or wind forecasts. Consistent with this view, the first recommendation of the National Grid ESO report was a call for an assessment of " . . . whether it would be appropriate to provide for higher levels of resilience in the electricity system." (National Grid ESO, 2019c, p. 6).

Thus, there is an ongoing need for computer systems and methods that provide improved energy load forecasts to electric power grids to address the above-mentioned and other technological problems.

SUMMARY OF THE INVENTION

Using data from the New York City electricity zone as an example, exemplary embodiments of the present invention present an econometrically based method to resolve the— above mentioned technological challenges. In an exemplary embodiment, archived meteorological forecasts and the system operator's load forecasts for the New York City electricity zone are used as regressors in a time-series econometric model in which the actual hourly utility-supplied load for New York City is the dependent variable. As explained herein, the present invention uses time-series methods to address technological challenges, such as load forecasting issues, associated with the Duck curve.

Exemplary embodiments of the present invention address the above-mentioned technological problems by using econometric time-series methods to significantly mitigate the challenge posed by the "Duck Curve" by making the ramp associated with the "neck of the Duck" more predictable. Based on the findings of Forbes and Zampelli (2019), the improvement in predictability has favorable implications for $CO_2$ emissions. There do not appear to be any barriers to using this approach to model solar energy generation that is directly injected into the transmission system.

In an exemplary embodiment of the present invention, a method of improving the accuracy of an electric power grid load forecast computer system includes the steps of: obtaining, at the one or more computers, electrical grid information comprising a day-ahead forecasted level of load on the electric power grid; accessing, on one or more databases operatively connected to the one or more computers, forecasted weather condition data; and calculating, by the one or more computers, coefficients for a load forecast equation by performing a regression analysis using the forecasted weather condition data. The explanatory variables in the equation include the level of forecasted load reported by the system operator, the forecasted level of distributed renewable energy generation, and forecasted weather conditions.

In exemplary embodiments, the method further comprises calculating, by the one or more computers, a revised load forecast by applying the load forecast equation.

In exemplary embodiments, the method further comprises providing, by the one or more computers, to an energy management computer system, the revised load forecast for generation of a schedule of conventional and renewable energy generation within the electric power grid.

A method according to an exemplary embodiment of the present invention comprises: (A) accessing, by one or more computers, one or more electronic databases, stored on one or more computer readable media, the one or more databases comprising: (i) forecasted meteorological conditions data associated with a geographical area encompassing an electric power grid; (ii) forecasted energy load data associated with the electric power grid as obtained from an energy management computer system associated with the electric power grid; (iii) time data comprising at least one of time of day data or season data associated with the electric power grid; (iv) historical data comprising historical load data, historical forecasted meteorological conditions data, historical forecasted wind and solar energy, and historical time data corresponding to the historical forecasted meteorological conditions data; (B) calculating, by the one or more computers, a revised load forecast based on the forecasted meteorological conditions data, the forecasted wind and solar energy, the forecasted load data, the time data and time-series variables determined based on an analysis of the historical data, wherein the calculating step comprises: (i) estimating, by the one or more computers, a structural equation of electricity load based on the historical data, where the electricity load is a dependent variable of the structural equation; (ii) analyzing, by the one or more computers, the structural equation to determine whether the electricity load as the dependent variable requires transformation; (iii) performing, by the one or more computers, a multivariable fractional polynomial analysis of explanatory variables in the structural equation with the dependent variable transformed or not transformed as determined in step (B)(ii) to determine whether each of the explanatory variables have a linear or non-linear specification; (iv) performing, by the one or more computers, a time series analysis of the structural equation with the dependent variable transformed or not transformed as determined in step (B)(ii) and with each of the explanatory variables having a linear or non-linear specification as determined in step (B)(iii); (v) generating, by the one or more computers, a load prediction equation based on the time series analysis of the structural equation with the dependent variables transformed or not transformed as determined in step (B)(ii) and with each of the explanatory variables having a linear or non-linear specification as determined in step (B)(iii); and (vi) calculating, by the one or more computers, a revised forecast of energy load by inputting the forecasted meteorological conditions data, the forecasted load data, the forecasted wind and solar data, and the time data to the load prediction equation; and C) providing, by the one or more computers, to an energy management computer system, the revised load forecast to enable the appropriate levels of generation of conventional and renewable energy generation within the electric power grid.

A system according to an exemplary embodiment of the present invention comprises: one or more data processing apparatus; and a computer-readable medium coupled to the one or more data processing apparatus having instructions stored thereon which, when executed by the one or more data processing apparatus, cause the one or more data apparatus to perform a method comprising: (A) accessing, by one or more computers, one or more electronic databases, stored on one or more computer readable media, the one or more databases comprising: (i) forecasted meteorological conditions data associated with a geographical area encompassing an electric power grid; (ii) forecasted energy load data associated with the electric power grid as obtained from an energy management computer system associated with the electric power grid; (iii) time data comprising at least one of time of day data or season data associated with the electric power grid; (iv) historical data comprising historical load data, historical forecasted meteorological conditions data, historical forecasted wind and solar energy, and historical time data corresponding to the historical forecasted meteorological conditions data; (B) calculating, by the one or more computers, a revised load forecast based on the forecasted meteorological conditions data, the forecasted wind and solar energy, the forecasted load data, the time data and time-series variables determined based on an analysis of the historical data, wherein the calculating step comprises: (i) estimating, by the one or more computers, a structural equation of electricity load based on the historical data, where the electricity load is a dependent variable of the structural equation; (ii) analyzing, by the one or more computers, the structural equation to determine whether the electricity load as the dependent variable requires transformation; (iii) performing, by the one or more computers, a multivariable fractional polynomial analysis of explanatory variables in the structural equation with the dependent variable transformed or not transformed as determined in step (B)(ii) to determine whether each of the explanatory variables have a linear or non-linear specification; (iv) performing, by the one or more computers, a time series analysis of the structural equation with the dependent variable transformed or not transformed as determined in step (B)(ii) and with each of the explanatory variables having a linear or non-linear specification as determined in step (B)(iii); (v) generating, by the one or more computers, a load prediction equation based on the time series analysis of the structural equation with the dependent variables transformed or not transformed as determined in step (B)(ii) and with each of the explanatory variables having a linear or non-linear specification as determined in step (B)(iii); and (vi) calculating, by the one or more computers, a revised forecast of energy load by inputting the forecasted meteorological conditions data, the forecasted load data, the forecasted wind and solar data, and the time data to the load prediction equation; and C) providing, by the one or more computers, to an energy management computer system, the revised load forecast to enable the appropriate levels of generation of conventional and renewable energy generation within the electric power grid.

In an exemplary embodiment, forecasted meteorological conditions comprise one or more of the following: forecasted temperature; forecasted wind speed; forecasted humidity; forecasted solar radiation; forecasted air pressure; forecasted air density, forecasted wind density; forecasted dewpoint; forecasted visibility; forecasted probability of precipitation; and forecasted sky conditions.

In an exemplary embodiment, the load prediction equation is a combination of the structural forecast equation structural equation with the dependent variable transformed or not transformed as determined in step (B)(ii) and with each of the explanatory variables having a linear or non-linear specification as determined in step (B)(iii) and a time series variables as determined by the time series analysis.

In an exemplary embodiment, step (B)(ii) comprises a Box-Cox analysis.

In an exemplary embodiment, the explanatory variables comprise one or more coefficients and exponents.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

The increasing utilization of distributed energy resources (DERs) such as rooftop solar has brought about environmental benefits but has also reduced the accuracy of the load forecasts that system operators use to optimize the resources of the power grid. One consequence of this is the so-call "Duck curve," as discussed above, which was first documented in California where the output of solar energy gives rise to a net load profile that looks like a duck. This profile is believed to pose a significant challenge to system operators. Other regions vulnerable to this challenge include the New York City electricity zone, a region in which the load forecast errors can have significant consequences for the cost of balancing electricity supply with demand because of the congestion in the transmission lines that feed into NYC from upstate New York. Other regions, both within and outside the United States, are also vulnerable to the "Duck curve" and related phenomenon.

Figure 14:
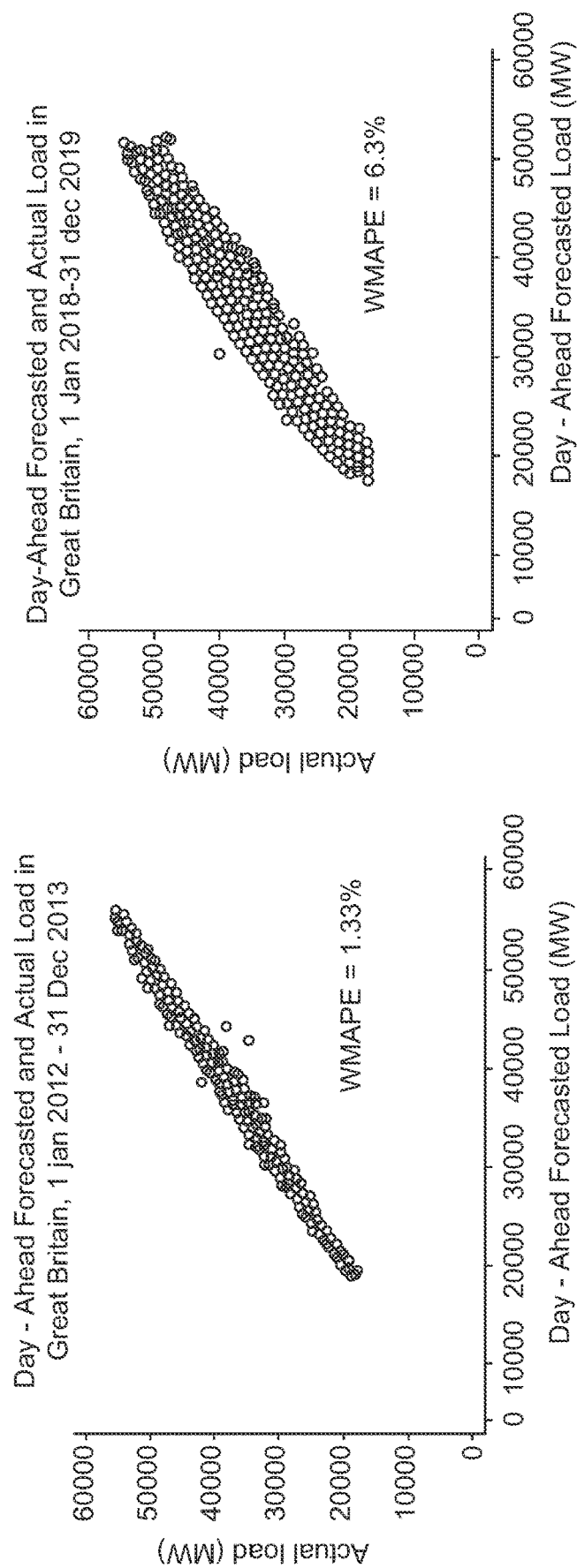
FIG. 14 is a graph of Day-Ahead Forecasted and Actual Load in Great Britain: 2012/2013 vs 2018/2019.

The accuracy of the load forecasts is the place to begin in light of the significant reduction in the accuracy of the load forecasts since 2012/2013, as shown in FIG. 14, which is a graph of Day-Ahead Forecasted and Actual Load in Great Britain: 2012/2013 vs 2018/2019. In conventional computer systems used to predict the amount of renewable energy to be provided by an electric utility for a given day, technical issues exist in regards to obtaining an accurate prediction for the amount of distributed energy resources, such as, for example, solar energy and wind energy, available to the utility for that day. These technical problems relate to how the systems used in such predictions identify, obtain, and interact with other computer systems within the electric grid environment, such as the system operator computer system and various utility computer systems, to obtain relevant data points, and to the processes used to make such predictions accurate. For example, in the context of the above-mentioned "Duck Curve" phenomenon, a system operator computer system may not have accurate predictions of the total load on the system due to inaccuracies in renewable energy forecasting. This is particularly problematic at the end of the day at the "neck" of the duck, where output of the grid may need to be ramped up to keep up with the sudden drop off of distributed energy resources and increased demand. This high ramp-up often results in operation of generators at less-than-optimal efficiency, such as, for example, operation at frequencies outside of the normal utility frequency (e.g., 50 Hz, 60 Hz, etc.).

The present invention overcomes these and other technical issues present in the conventional art. In embodiments of the systems and methods of the present invention, an econometrically based method is used to address the challenge posed by the Duck curve. In an exemplary embodiment, archived meteorological forecasts and the system operator's load forecasts for an electricity zone are used as regressors in a time-series econometric model in which the actual hourly utility-supplied load for a geographic region (e.g., New York City) is the dependent variable.

Figure 15:
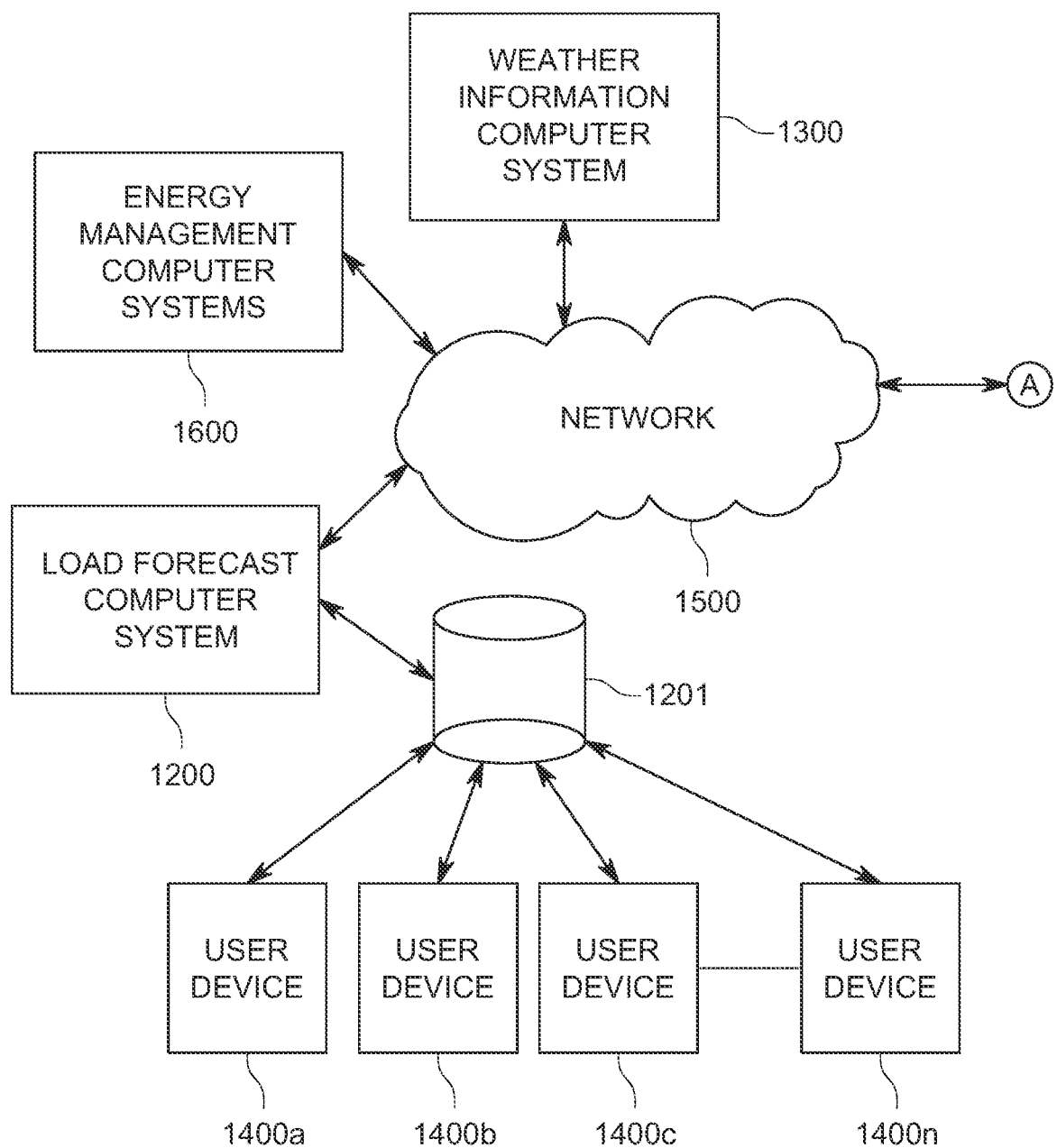
FIG. 15 is a block diagram showing the interaction between a load forecast computer system, an energy management computer system and an electric power grid according to an exemplary embodiment of the present invention.
Figure 15:
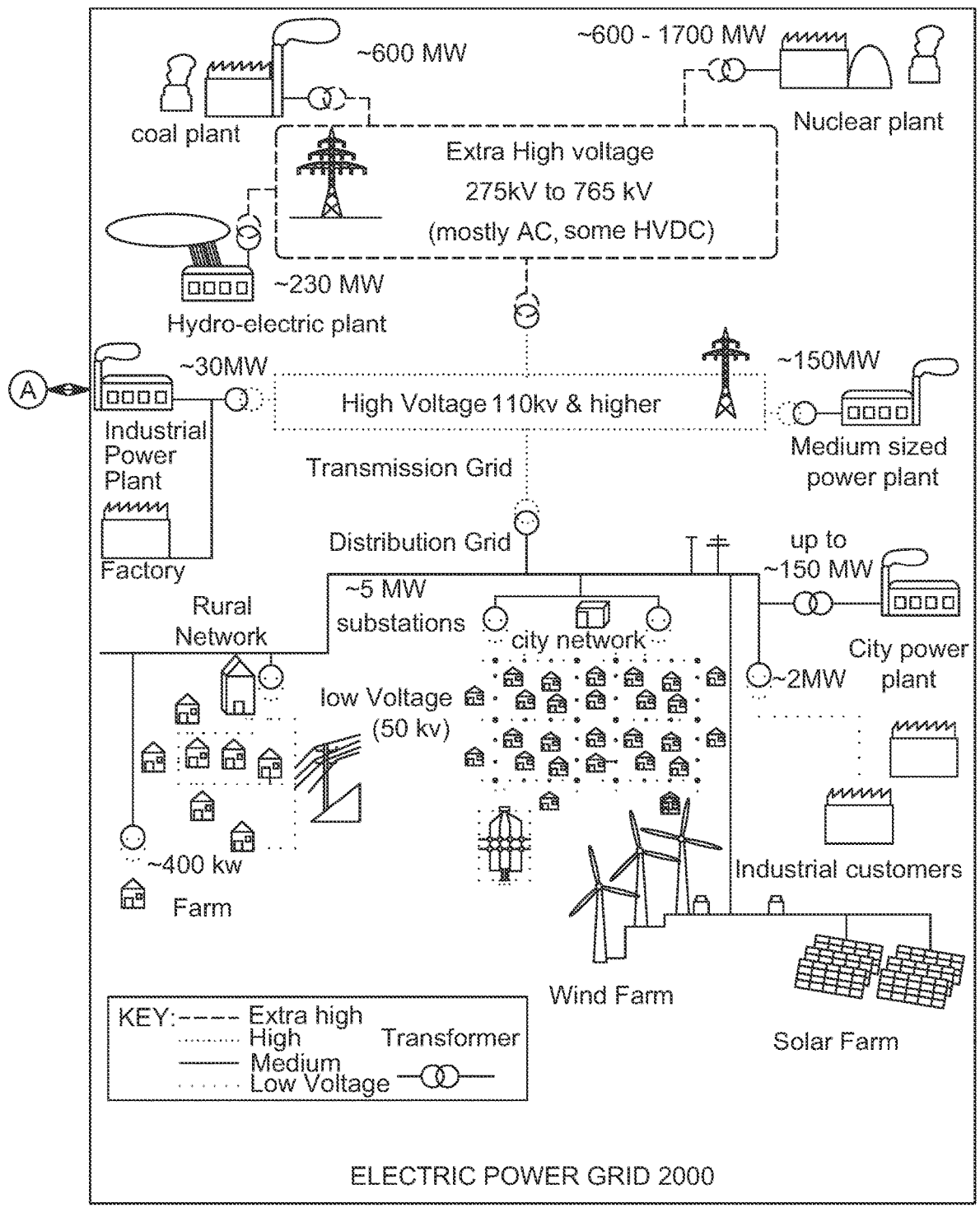

FIG. 15 is a block diagram showing the interaction between a load forecast computer system 1200, an energy management computer system 1600 and an electric power grid 2000 according to an exemplary embodiment of the present invention. As explained in more detail herein, the load forecast computer system 1200 is configured to provide refined forecasts of expected load on the electric power grid 2000 based on a counterintuitive use of a time-series econometric model. The load forecast computer system 1200 obtains electrical grid information from a database 1201. Such electrical grid information can include, for example, a day-ahead forecasted level of renewable energy generation, e.g., by solar power or by wind power. The electrical grid information can also include any of the variables disclosed herein in connection with embodiments of the present invention.

In exemplary embodiments of the system of the present invention, the load forecast system 1200 also obtains forecasted weather information provided by weather information computer system 1300. As shown in FIG. 15, the load forecast computer system 1200 can obtain the necessary weather information from weather information computer system 1300 through network 1500, either directly or, alternatively, after such information is stored in database 1201.

As also shown in FIG. 15, the load forecast computer system 1200 can communicate with one or more user devices 1400a-1400n as necessary or desirable in accordance with embodiments of the present invention.

All computers, computer systems, and/or user devices described herein may comprise one or more processors and non-transitory computer-readable memory (e.g., local and/or remote memory) having stored thereon computer-readable instructions to perform the processes described herein with respect to each device and/or computer system. In embodiments, various processing may be performed by particularly programmed software agents or software modules. Each device and/or computer system may store data in its respective memory, which may be organized in one or more databases. Each device and/or computer system may also have one or more input devices (e.g., touchscreen, pointer device, mouse, keyboard, microphone, camera, video camera, to name a few) and/or one or more output devices (e.g., display screens, projectors, speakers). In embodiments, computer systems may comprise one or more servers or server farms, which may not have physical input or output devices directly connected thereto or embedded therein.

Each device and/or computer system may also include one or more communication portals. Accordingly, the devices and/or computer systems (e.g., load forecast computer system 1200 and weather information system 1300, user devices 1400a-1400n) may be operatively connected directly, e.g., via wired or wireless communications, and/or indirectly, e.g., via a data network 1500, such as the Internet, a telephone network, a mobile broadband network (e.g., a cellular data network), a mesh network, a local area network (LAN) (including a wireless local area network, e.g., a Wi-Fi network), a wide area network (WAN), a metropolitan area network (MAN), and/or a global area network (GAN), to name a few. Data networks may be provided via wired and/or wireless connections. Data networks may be public or private. Accordingly, data networks may be open or closed, such as requiring authorized access, specific communication connections, or specialized hardware and/or software. In embodiments, any combination of communications channels may be utilized.

The respective communications portals of each computer system and/or user device may handle, process, support, and/or perform wired and/or wireless communications, such as transmitting and/or receiving data (e.g., data packets). In embodiments, transmission described with respect to a single data packet may comprise a plurality of data packets. Data packets may be discrete electronic units of data. In other embodiments, transmissions may comprise non-discrete signals, such as data streams. Transmissions described with respect to data packets may also comprise data transmissions via other communications mechanisms known in the art, such as data streams. Communications portals can comprise hardware (e.g., hardware for wired and/or wireless connections, such as communications chipsets, communications interfaces, and/or communications antennas, to name a few) and/or software.

Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1.times.RTT, Ev-DO, HSPA, UMTS, 3G, 4G, 5G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few. In exemplary embodiments, communications may be encrypted by encryption techniques, such as, for example, symmetrical encryption or public key encryption.

The load forecast computer system 1200 may include a computer system having a non-transitory computer-readable memory, which may store data, e.g., in one or more databases or data stores. Accordingly, the load forecast computer system 1200 can store various types of weather data and other variables, as described herein in connection with embodiments of the present invention. According to an exemplary embodiment, the system 1200 stores historical and current forecasts of weather with the following variables: forecasted temperature, forecasted humidity, forecasted cloud cover, forecasted dew point, etc., and the data stores contain the historical and current renewable energy forecasts posted by the system operator and/or obtained from the energy management computer system 1600. The load forecast computer system 1200 may also include one or more software modules stored in the memory and configured to execute machine-readable instructions to perform one or more processes. Such modules can include modules that perform the calculations described herein with regard to improving the accuracy of the renewable energy generation prediction computer system. The processes and functions described with respect to each module may be performed by one or more other modules, such as other modules described herein or additional modules.

Figure 16:
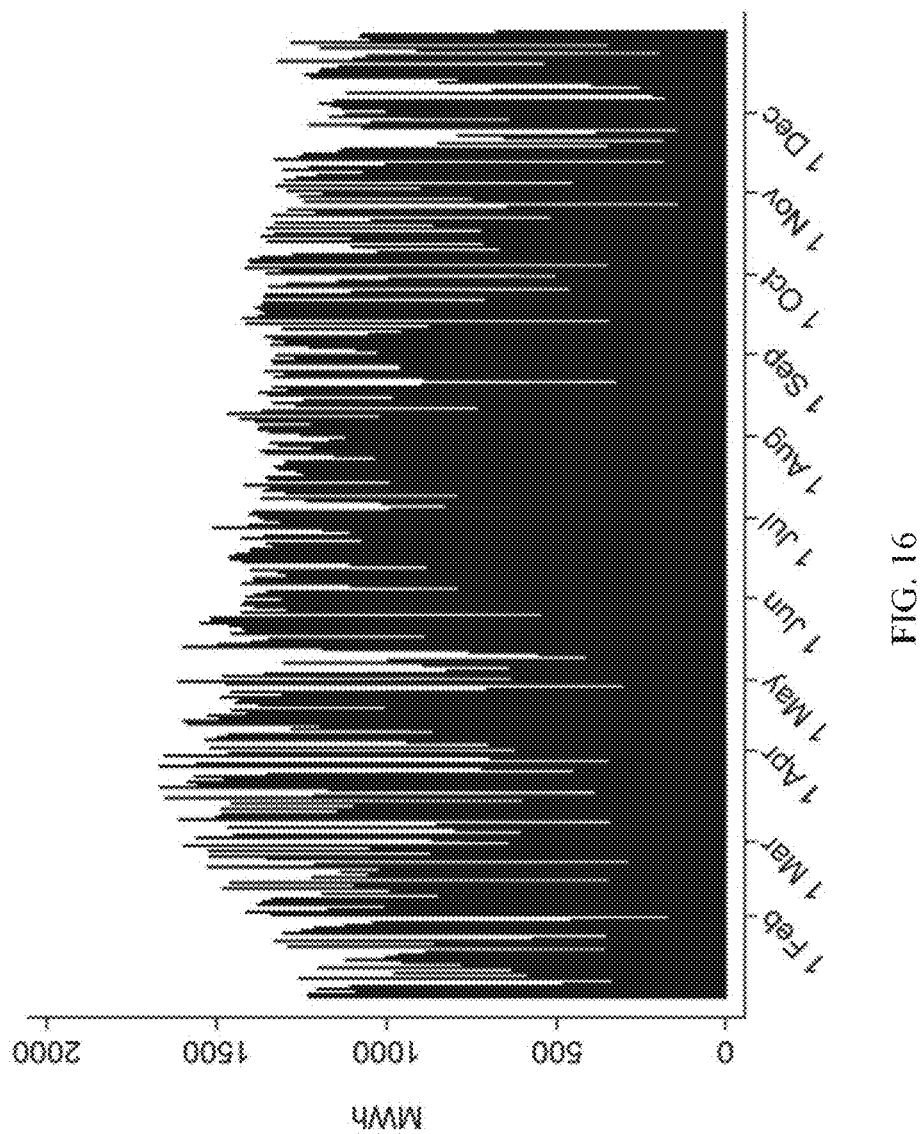
FIG. 16 shows simulated PV energy production for a typical year based on NREL PVWATTs (https://pvwatts.nrel.gov/pvwatts.php) hourly model outputs for LaGuardia Airport and an assumed PV capacity of 2,000 MW.

Based on the high degree of variability of the simulated PV energy production for a typical year, the prospect of substantial increases in supplies of electricity from rooftop solar would invariably seem to have ominous implications for the accuracy of the load forecasts in NYC. FIG. 16, for example, shows simulated PV energy production for a typical year based on NREL PVWATTs (https://pvwatts.nrel.gov/pvwatts.php) hourly model outputs for LaGuardia Airport and an assumed PV capacity of 2,000 MW. This would indeed be the case if the PV output in hour t were purely random. However, the PV generation level in hour t is highly correlated with the PV output in hours t-24, t-48, t-72, t-96, etc.

Figure 17:
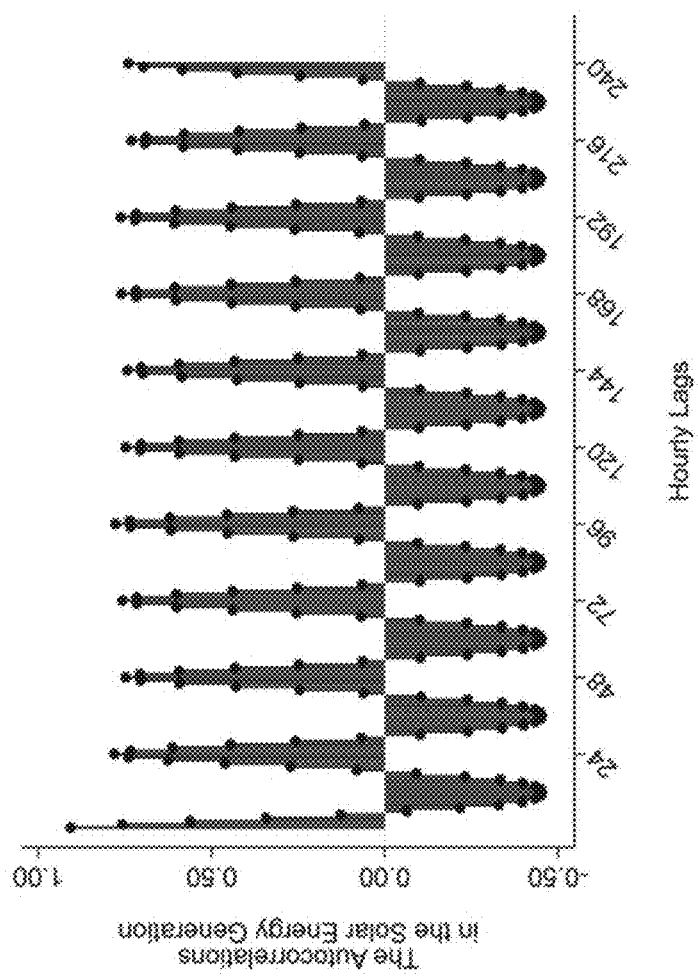
FIG. 17 shows the autocorrelations in Simulated PV Generation for the LaGuardia Airport Location.

FIG. 17, for example, shows the autocorrelations in Simulated PV Generation for the LaGuardia Airport Location. The magnitude and nature of the autocorrelations would not have been obvious those of skill in the art. Indeed, the textbook entitled, "Statistical Methods in the Atmospheric Sciences," authored by Wilks (2019), provides very little coverage of the methods employed in this disclosure. Indicative of this, readers of this well-known treatise would have believed that there is little, if any, need to model autocorrelations beyond AR(2).

Figure 18:
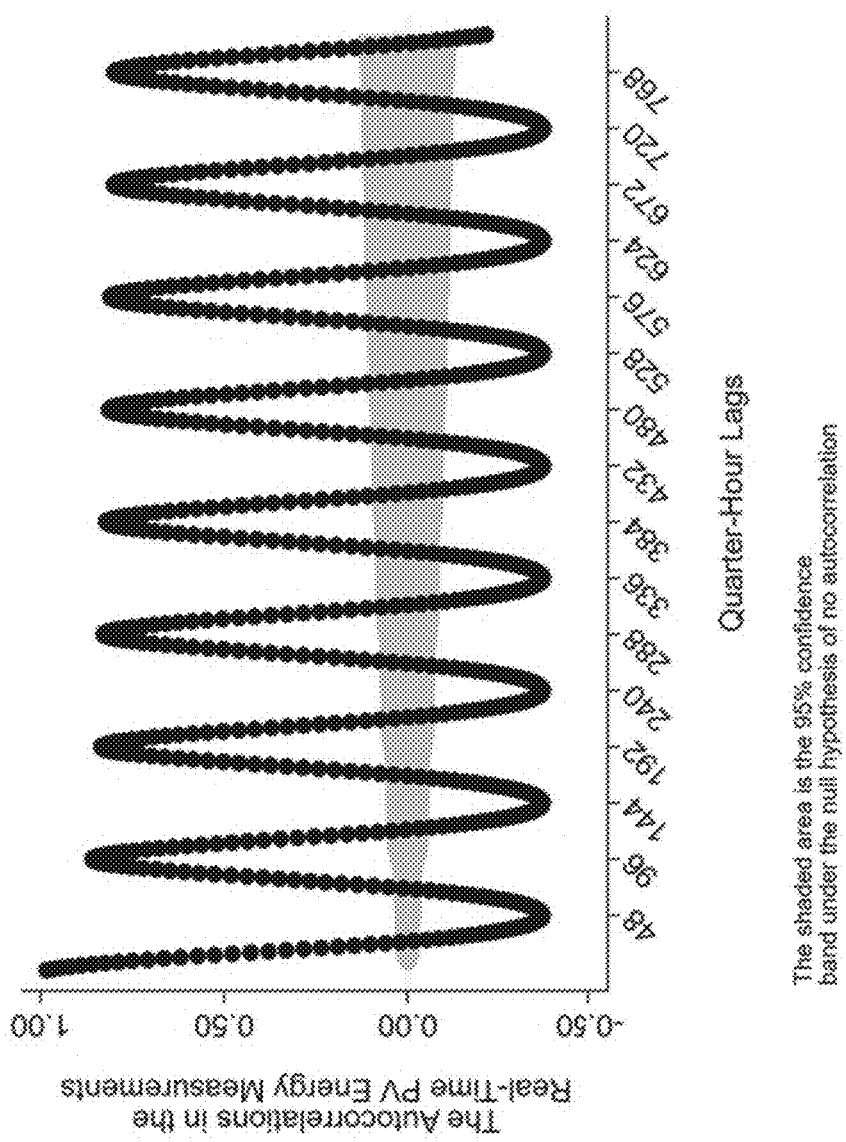
FIG. 18 is a graph of the autocorrelations in quarter-hour PV generation in Belgium, 1 Jan. 2017-31 Dec. 2018.

Returning to the example of FIG. 17, the correlation between the value in hour t and the values in hours t-24 and t-48 equal 0.78 and 0.74, respectively. While these values may be open to question given that the data are simulated, the result is nevertheless consistent with the autocorrelations in PV solar generation in Belgium, as shown in FIG. 18 which is a graph of the autocorrelations in quarter-hour PV generation in Belgium, 1 Jan. 2017-31 Dec. 2018. In accordance with exemplary embodiments of this invention, the pronounced nature of the autocorrelations may make it possible to accurately predict grid-supplied load using time-series methods even in the presence of substantial quantities of DERs given that the modeling of autocorrelations is one of the key characteristics of time-series methods. As a result of these autocorrelations, past levels of grid-supplied load, when coupled with expected meteorological conditions, can yield accurate predictions of grid supplied load.

In exemplary embodiments, the present invention applies a model of grid-supplied electricity load to improve the operational efficiency of electric power grids.

The following example illustrates aspects and advantages of the modeling approach according to the present invention and is not intended to be limiting in regard to the amount and source of data that may be used in other exemplary embodiments.

EXAMPLE

The modeling approach proceeds by estimating the model using 17,324 observations (1 Jan. 2015-31 Dec. 2016) and then performing an out-of-sample analysis with 17,424 observations (1 Jan. 2017-31 Dec. 2018).

It is assumed that the actual hourly level of grid-supplied electricity can be modeled as a function of forecasted/modeled meteorological conditions, a proxy for the insights and expectations of the wholesale market participants, and the forecasted hourly level of grid-supplied electricity. The model includes binary variables reflecting the hour of the day, day of the week, and season of the year. Several interactions among the explanatory variables are also recognized.

The power grid data for the model was obtained from NYSIO (https://www.nyiso.corn/). The archived day-ahead forecasted weather data for each hour were obtained from CustomWeather (https://customweather.com/), a California based firm that provides weather forecasts and related meteorological services for over 80,000 locations across the world. Unfortunately, several key variables of interest, such as forecasted sea level pressure and forecasted solar radiation, were not available from CustomWeather's data archive for the sample period. For this reason, the model also makes use of simulated weather data from Meteoblue, a meteorological service created at the University of Basel, Switzerland (https://www.meteoblue.com). For both meteorological data sets, the location of interest was LaGuardia Airport in Queens, New York.

The linear version of the model is represented as follows:

$$GLoad = \text{Constant} + \alpha_1 FT + \alpha_2 FDP + \alpha_3 FH + \alpha_4 FV + \alpha_5 FP + \quad (1)$$
$$\alpha_6 FWS + \alpha_7 PRECIP + \alpha_8 SNOW + \alpha_9 HCC + \alpha_{10} MCC +$$
$$\alpha_{11} LCC + \alpha_{12} RAD + \alpha_{13} SLP + \alpha_{14} SUN + \alpha_{15} Pratio + \alpha_{16} FLoad +$$
$$\alpha_{17}(Fload^*FT) + \alpha_{18}(Fload^*FH) + \alpha_{19}(Fload^*FT^*FH) +$$
$$\alpha_{20}(Fload^*HCC) + \alpha_{21}(Fload^*MCC) + \alpha_{22}(Fload^*LCC) +$$
$$\alpha_{23}(Fload^*FP) + \alpha_{24}(Fload^*PRECIP) + \alpha_{25}(Fload^*SNOW) +$$
$$\alpha_{26}(Fload^*SLP) + \alpha_{27}(Fload^*SLP^*FP) + \alpha_{28}(Fload^*SUN) +$$
$$\alpha_{29}(Fload^*RAD) + \sum_{i=2}^{24} \phi_i H_i + \sum_{i=2}^{7} \beta_i Weekday_i + \sum_{i=2}^{73} \gamma_i Season_i$$

where:
Gload is the hourly level of grid-supplied electricity load for the New York zone in NYISO
FT is the hourly day-ahead forecasted temperature in degrees Kelvin reported by CustomWeather
FDP is the hourly day-ahead forecasted dewpoint in degrees Kelvin reported by CustomWeather
FH is the hourly day-ahead forecasted relative humidity reported by CustomWeather
FV is the hourly day-ahead forecasted visibility reported by CustomWeather
FP is the hourly day-ahead forecasted probability of precipitation reported by CustomWeather
FWS is the hourly day-ahead forecasted wind speed reported by CustomWeather
PRECIP is the simulated conditional hourly value of precipitation reported by Meteoblue.
SNOW is the simulated conditional hourly value of snowfall reported by Meteoblue
HCC is the simulated hourly level of high cloud cover reported by Meteoblue
MCC is the simulated hourly level of medium cloud cover reported by Meteoblue
LCC is the simulated hourly level of low cloud cover reported by Meteoblue
RAD is the simulated hourly level of short-wave radiation reported by Meteoblue
SLP is the simulated hourly level of sea level pressure reported by Meteoblue
SUN is the number of simulated minutes of sunshine within each hour reported by Meteoblue
Hour is a series of binary variables representing the hour of the day
Weekday is a series of binary variables representing the day of the week
Season is a series of binary variables representing the seasons.

Exclusive of leap years, each of these binary variables represents five consecutive days. Thus, the binary variables represent 73 "seasons" over a year. Other numbers of seasons are also possible. For example, there would be 61 seasons if each season had six days. A model having 36 seasons is also possible.

The model was estimated using hourly data over the period 1 Jan. 2015 through 31 Dec. 2016. The empirical analysis was conducted in two phases. In the first phase, evidence is presented that rejects the model's linear form given by Eq. (1) and subsequently identifies a non-linear functional form that is a more statistically reliable descriptor of the complex relationships between the model's explanatory variables and the grid-supplied electricity load.

Figure 19:
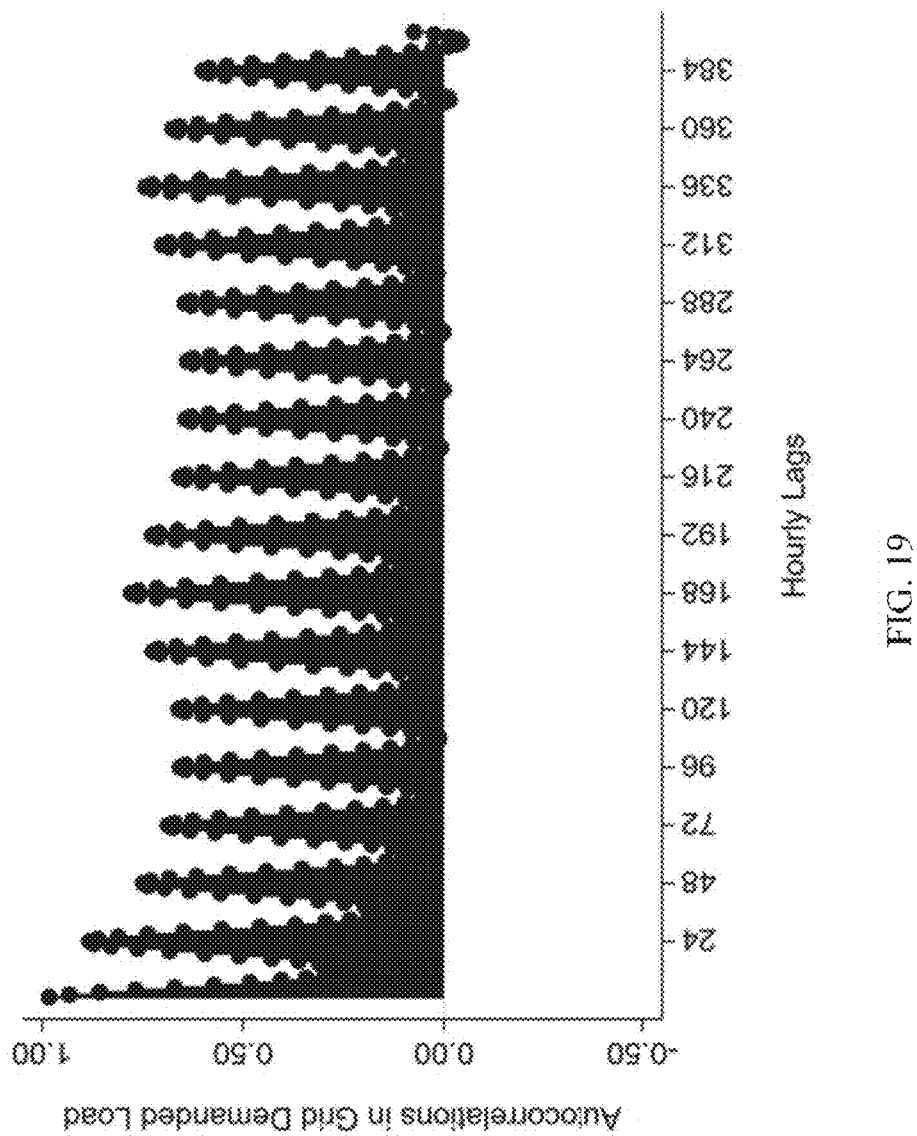
FIG. 19 which is a graph of the autocorrelations in the hourly grid-supplied load in NYC, 1 Jan. 2017-31 Dec. 2018.

The rationale for the proposed second step is to recognize that the level of grid demanded electricity in period t is highly correlated with the levels demanded in previous periods. The autocorrelations in the grid-supplied load do not monotonically decline over time, but instead, have a significant diurnal pattern over the 24-hour market periods for each day, as shown in FIG. 19 which is a graph of the autocorrelations in the hourly grid-supplied load in NYC, 1 Jan. 2017-31 Dec. 2018. For example, the level of grid demanded load in market period t is highly correlated with the load level in market period t-24 (24 hours previously), relative to its correlations with the load outcomes in other market periods from the day before. Additionally, the electricity load in period t is highly correlated with those in periods t-48, t-96, t-144, t-192, t-288, t-336, t-384 etc. The estimation needs to accommodate these characteristics of the grid-supplied load if accuracy in the load predictions is to be achieved.

Figure 1:
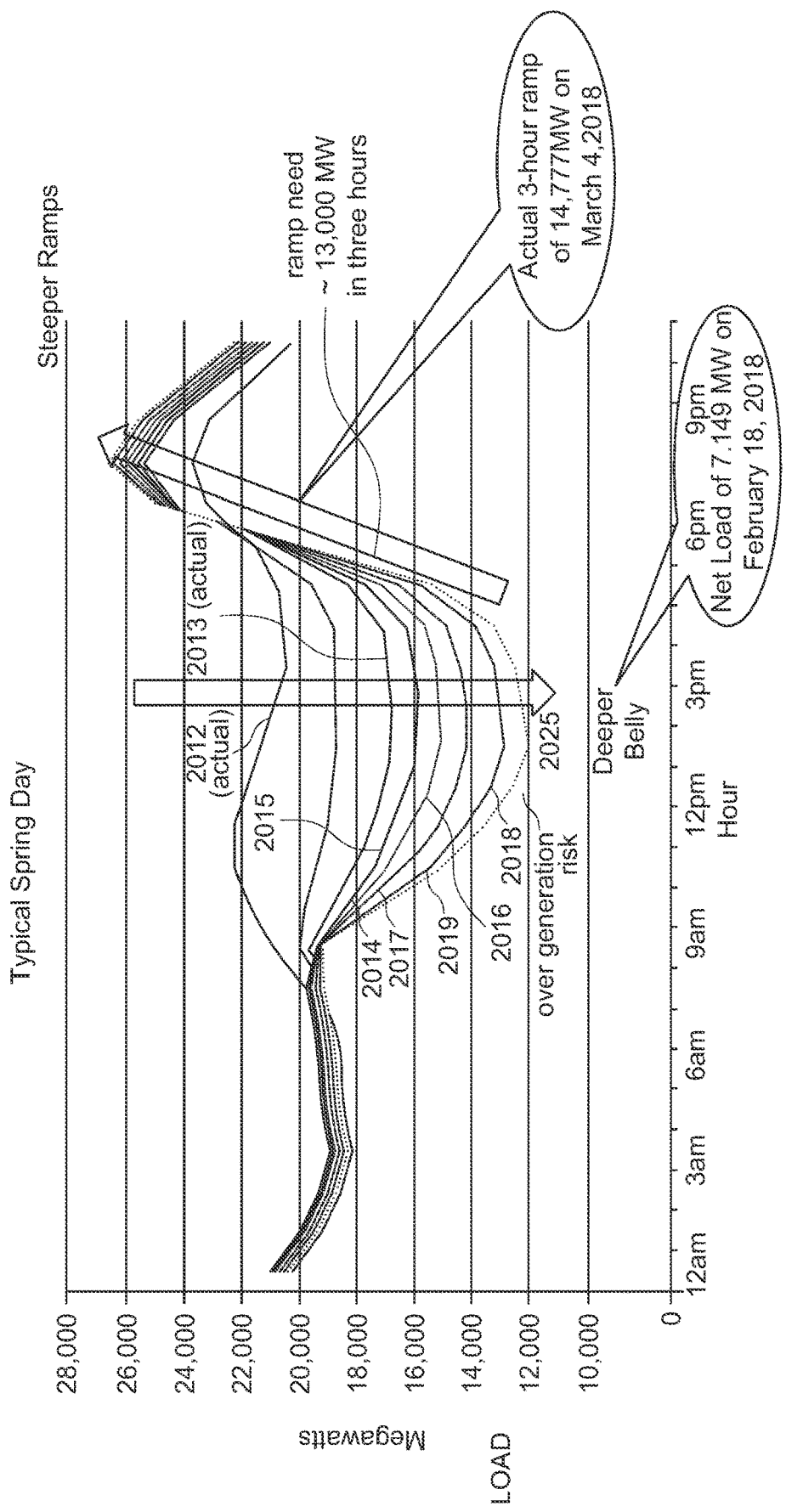
FIG. 1 is a chart of hour vs. megawatts during a typical spring day showing the "Duck Curve" phenomenon.
Figure 2:
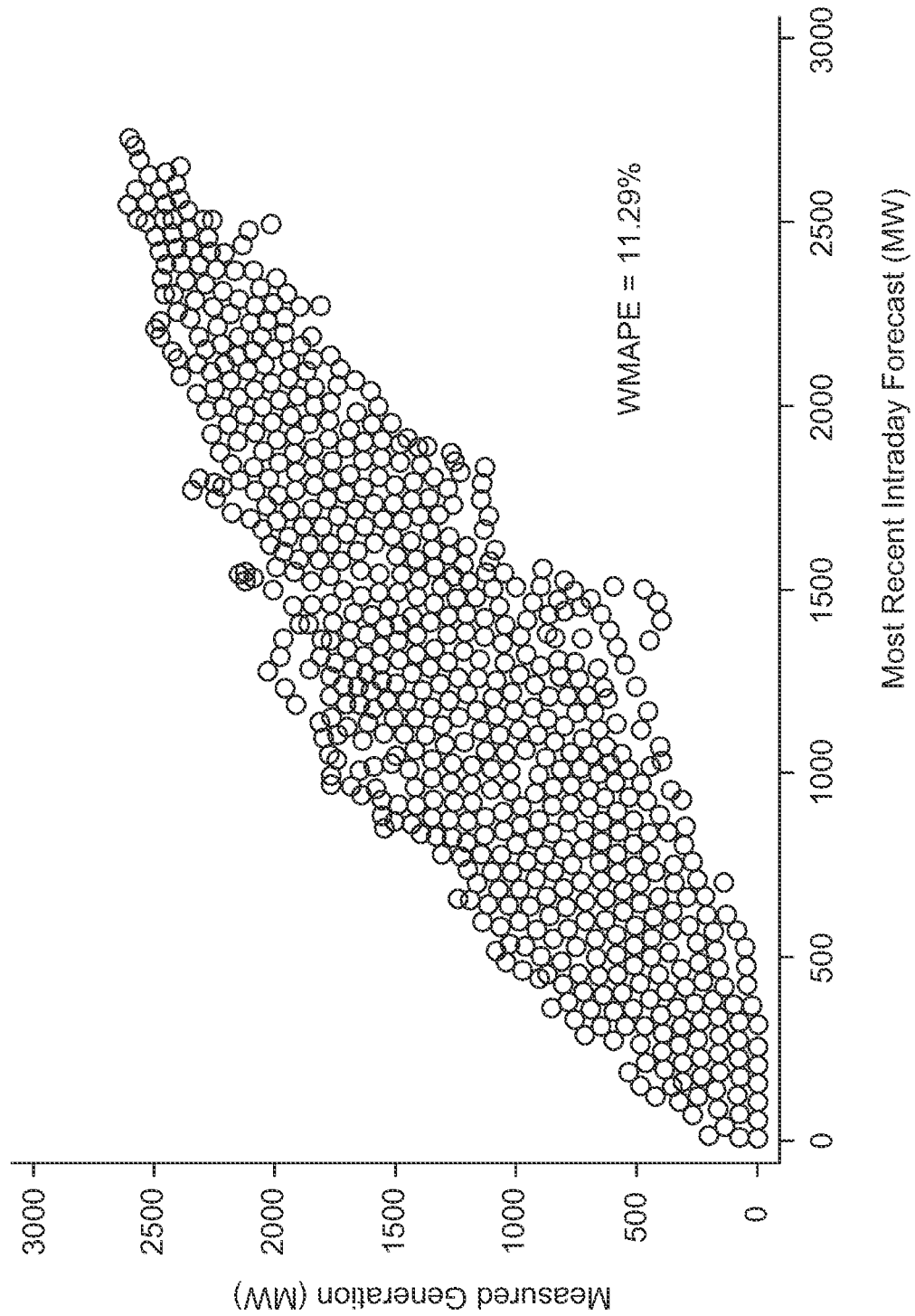
FIG. 2 is a chart of forecasted vs. actual solar energy in Belgium, 1 Jan. 2017-31 Dec. 2018.
Figure 3:
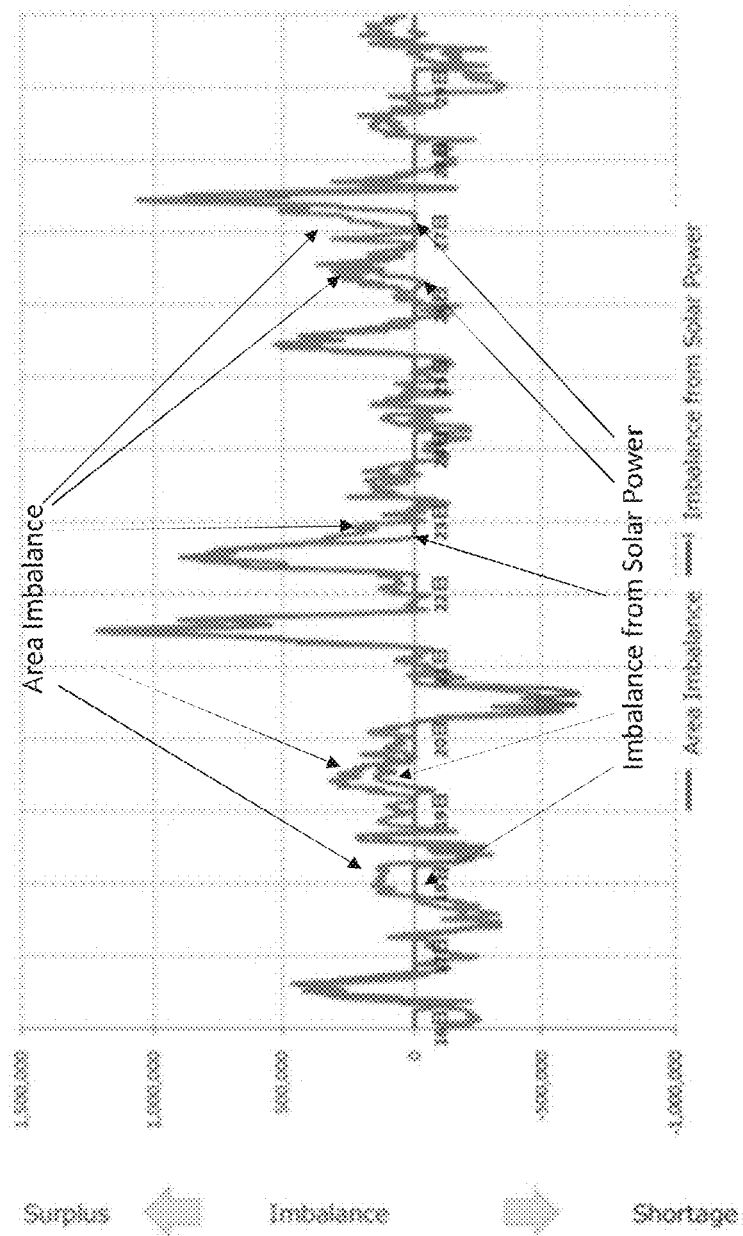
FIG. 3 is a chart showing the solar energy imbalance and the electricity imbalance in the Kyushu area of Japan.
Figure 4:
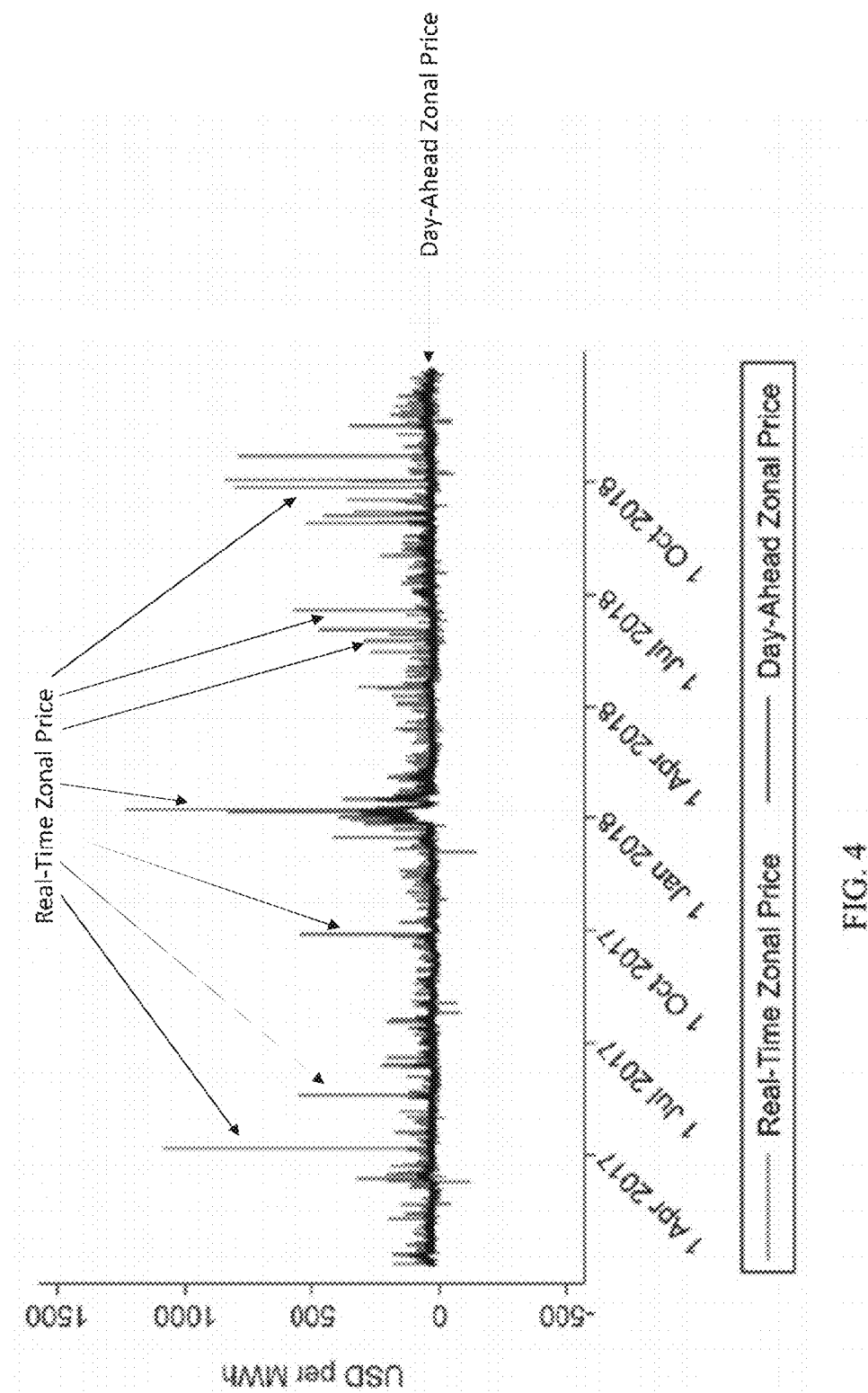
FIG. 4 is a chart of real-time vs. Day-Ahead Zonal Prices in NYISO's NYC Zone, 1 Jan. 2017-31 Dec. 2018.
Figure 5:
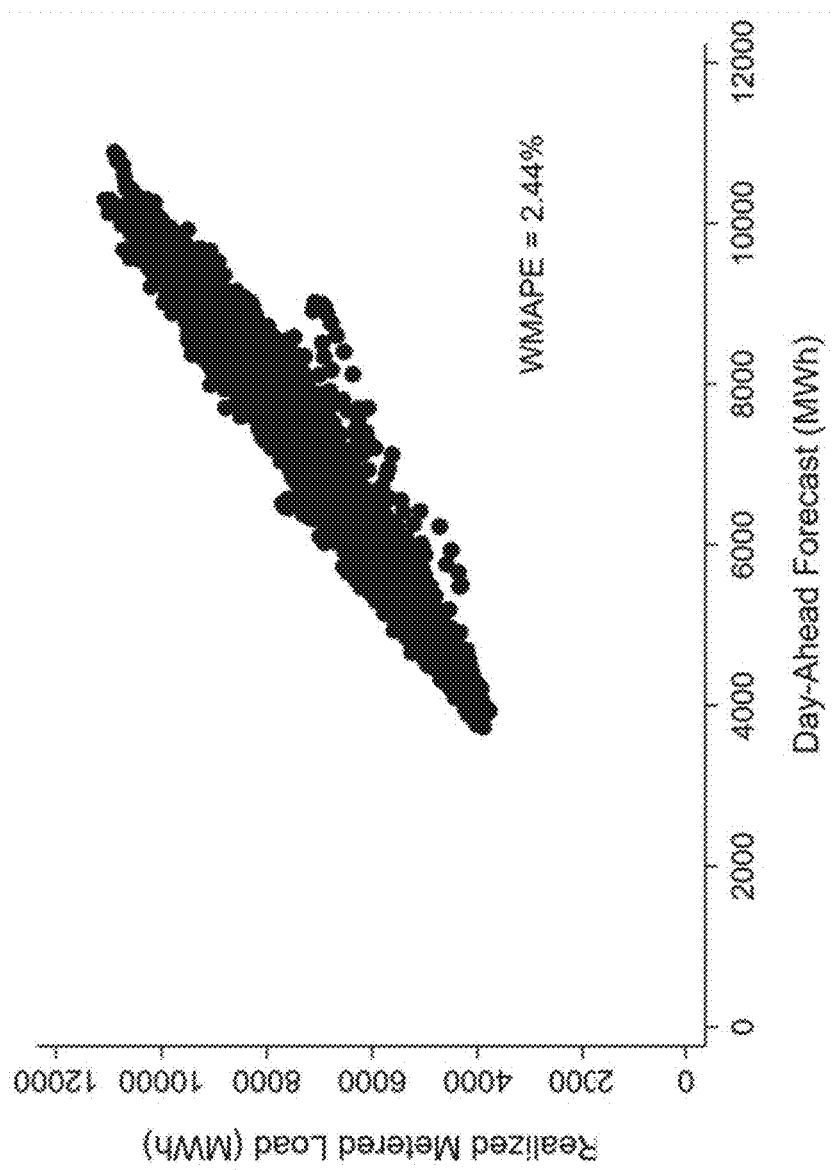
FIG. 5 is a graph of grid supplied load and the day-ahead forecasted load for New York City, 1 Jan. 2017-31 Dec. 2018.
Figure 6:
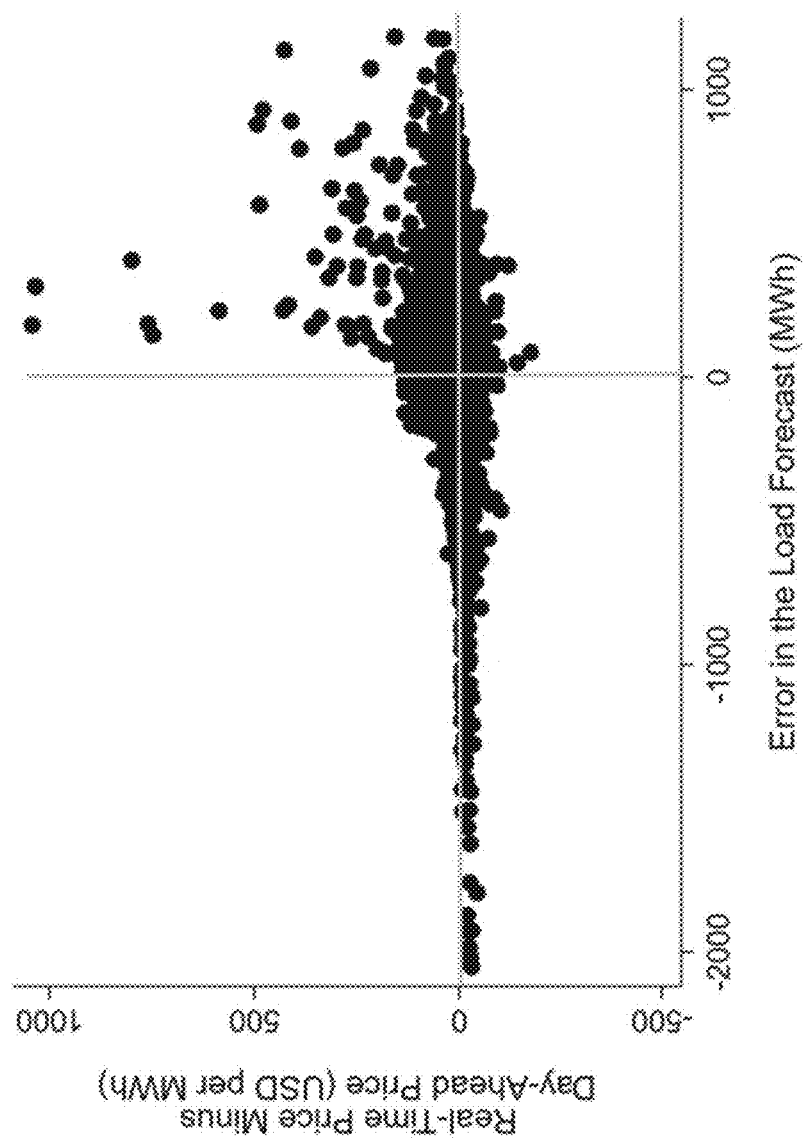
FIG. 6 is a graph of error in the load forecast and the real-time/day-ahead price difference for NYC, 1 Jan. 2017-31 Dec. 2018.
Figure 7:
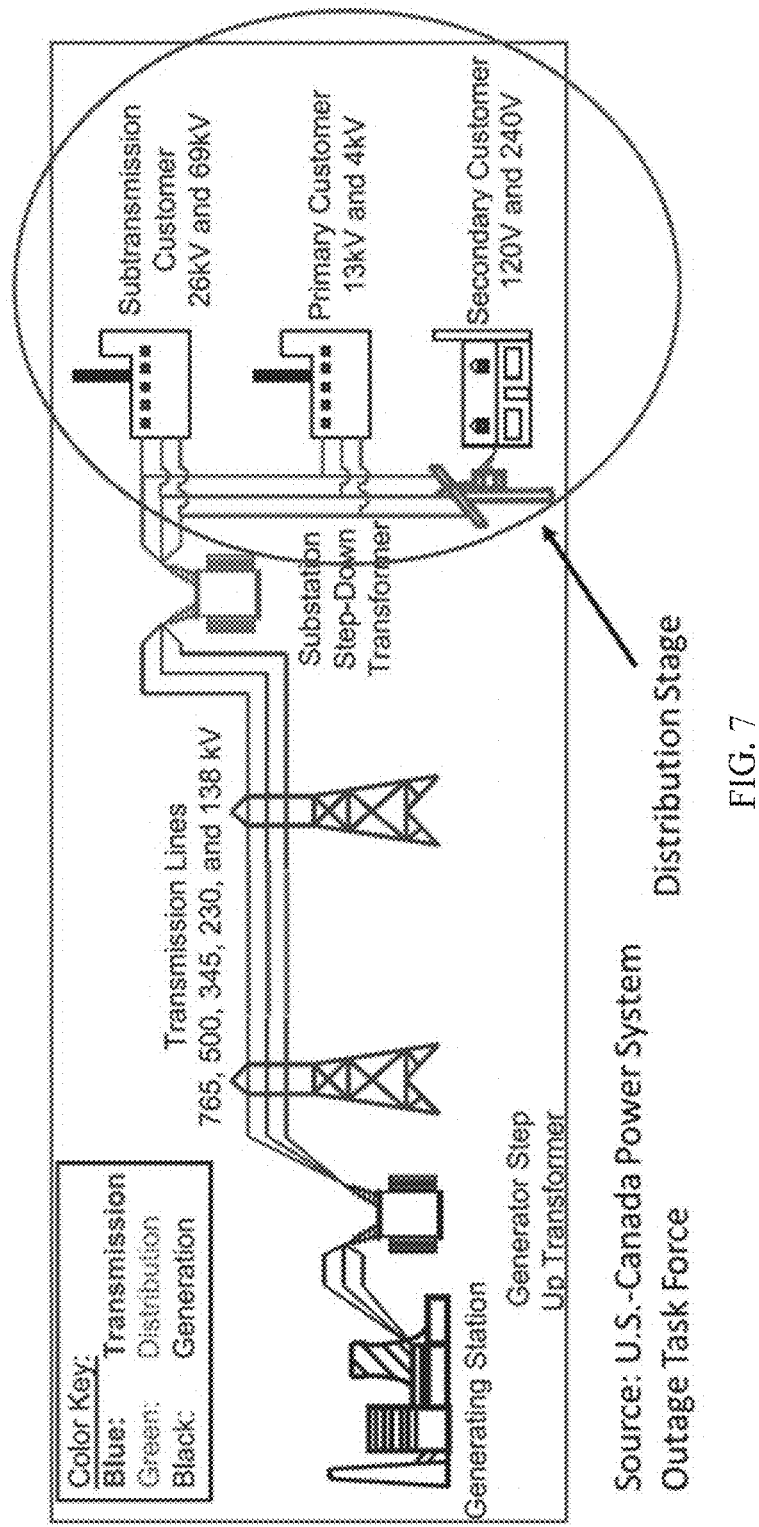
FIG. 7 shows the conventional model of the electric power industry.
Figure 8:
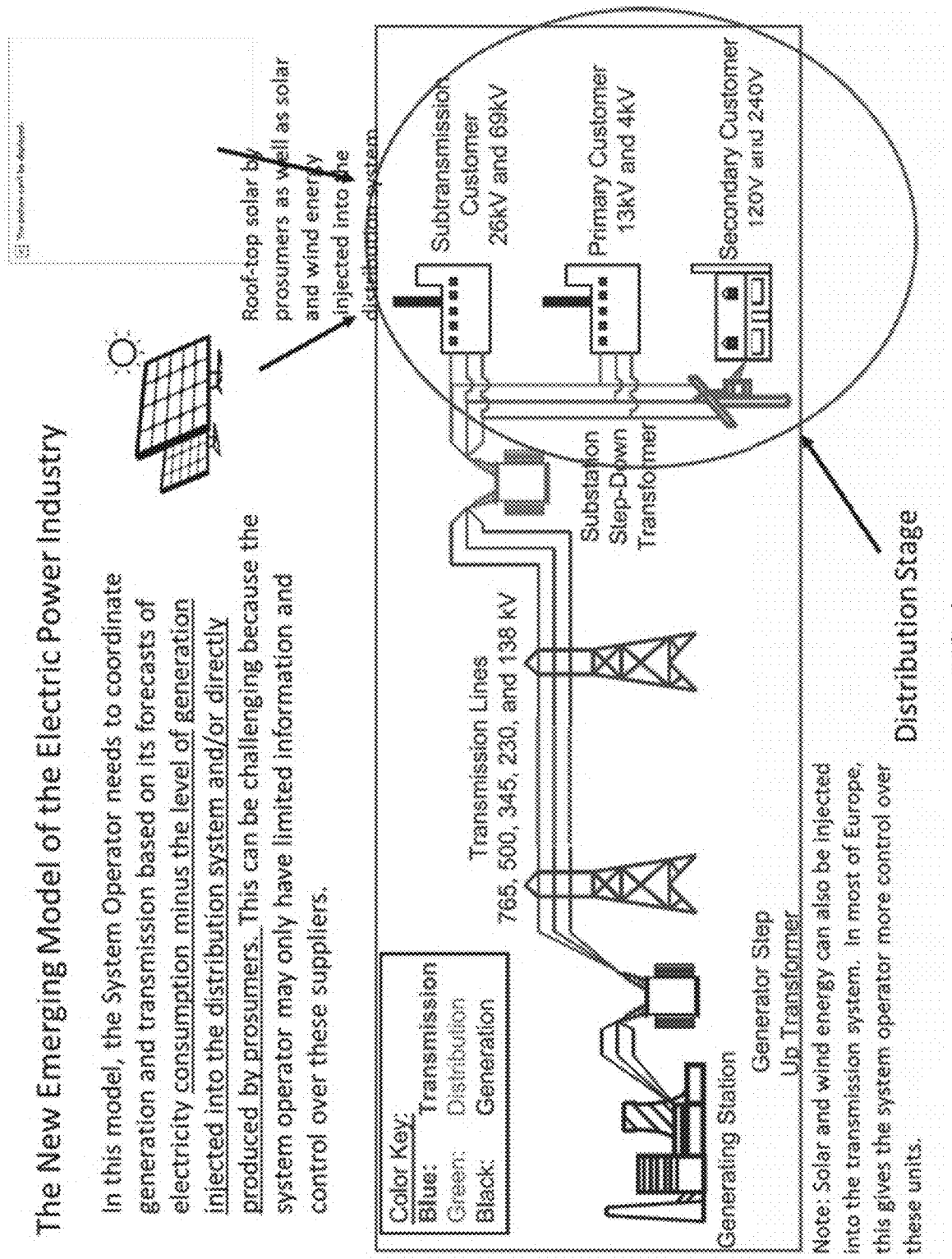
FIG. 8 shows the new emerging model of the electric power industry.
Figure 9:
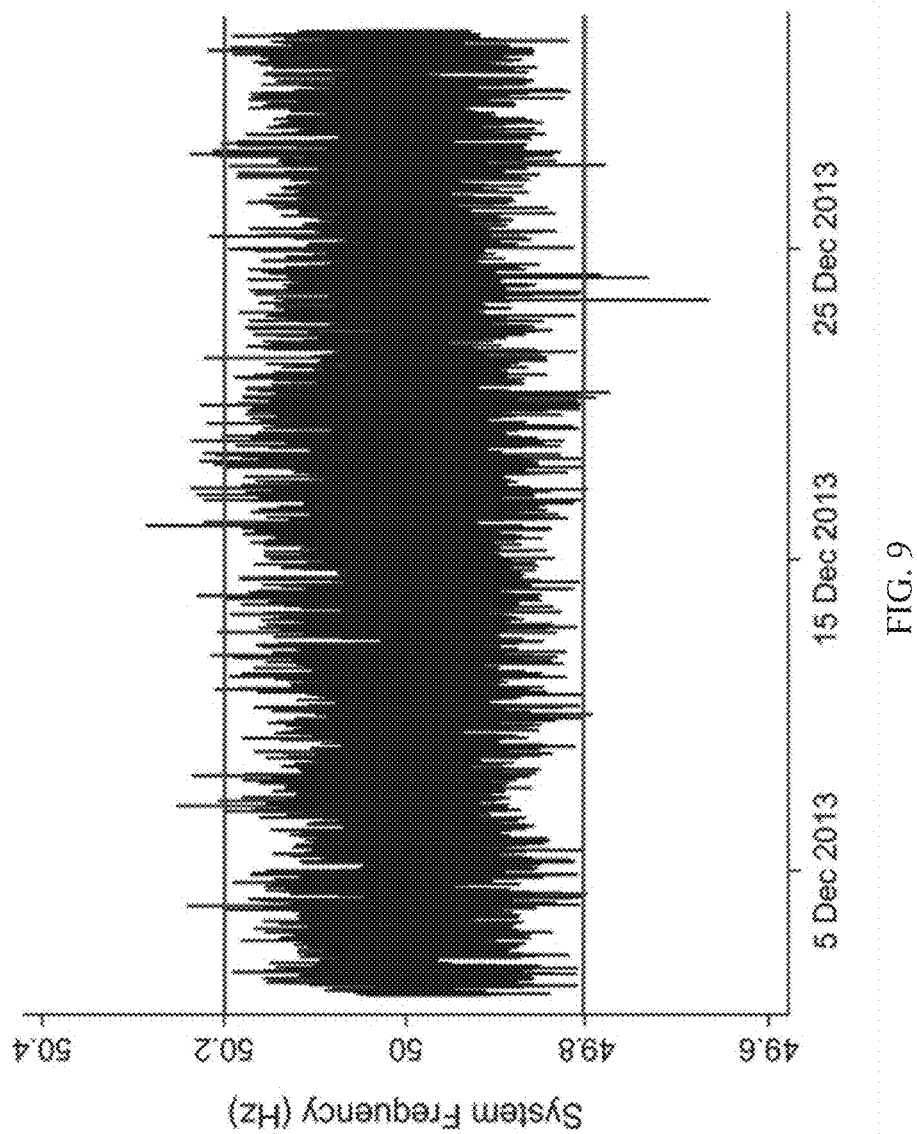
FIG. 9 is a graph of system frequency in Great Britain's power grid, 1 Dec.-31 Dec. 2013.
Figure 10:
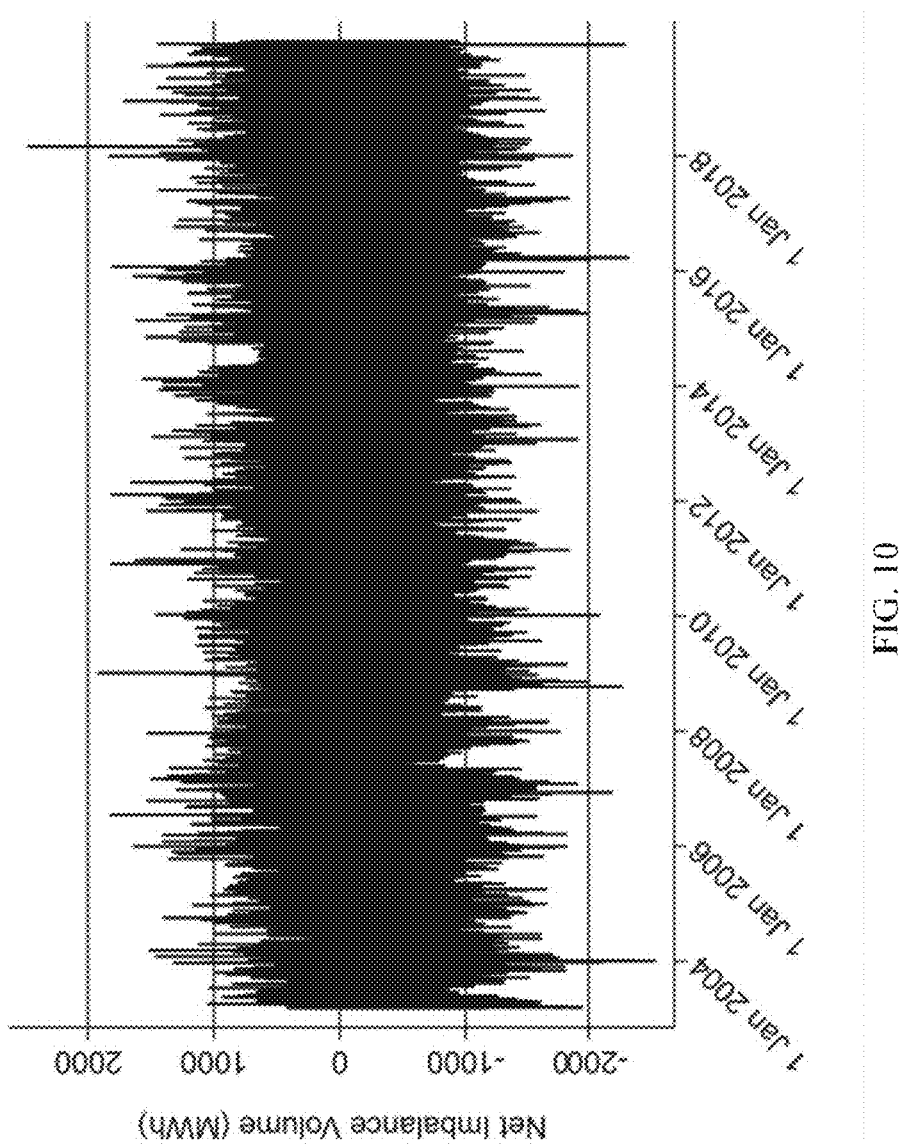
FIG. 10 is a graph of net energy imbalance in the power grid that serves Great Britain over a period of time.
Figure 11:
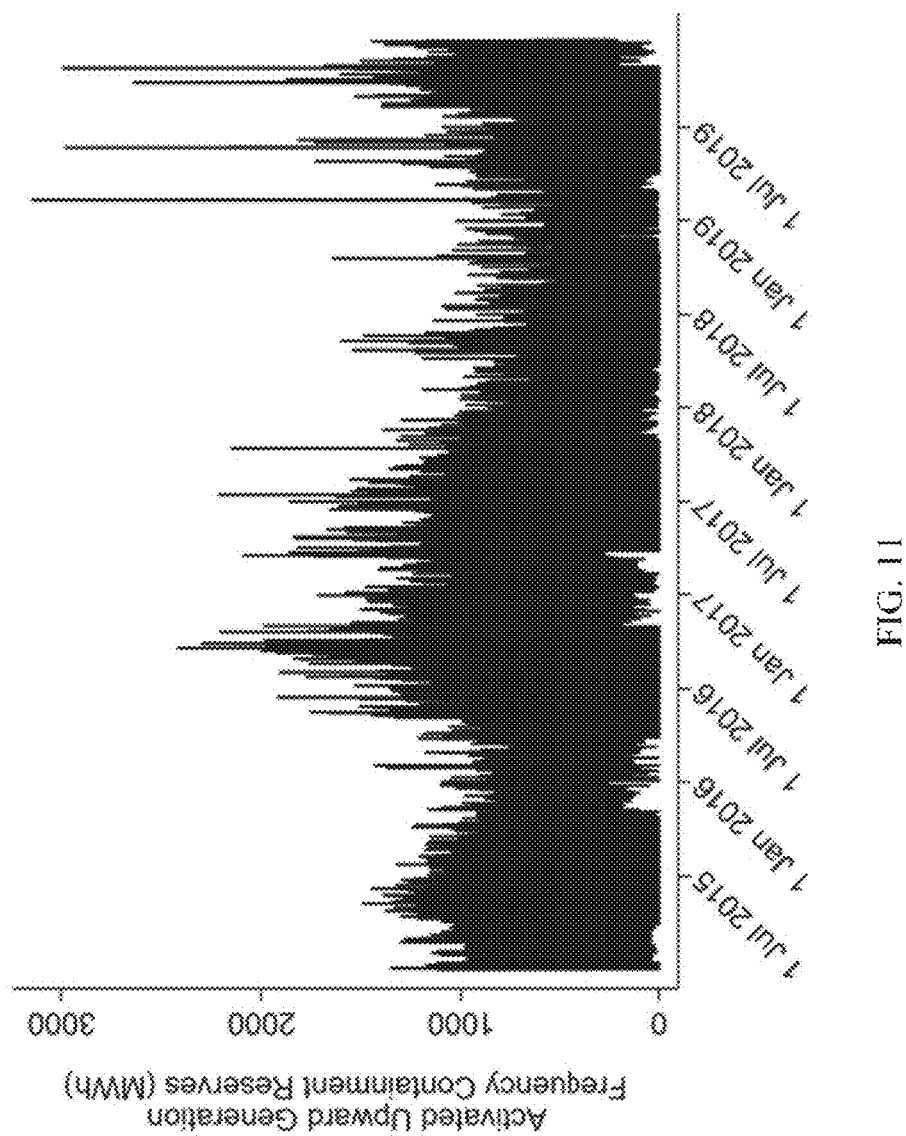
FIG. 11 is a graph of the activation of upward frequency containment generation reserves in the power grid that serves Great Britain, 1 Jan. 2015-31 Dec. 2019.
Figure 12:
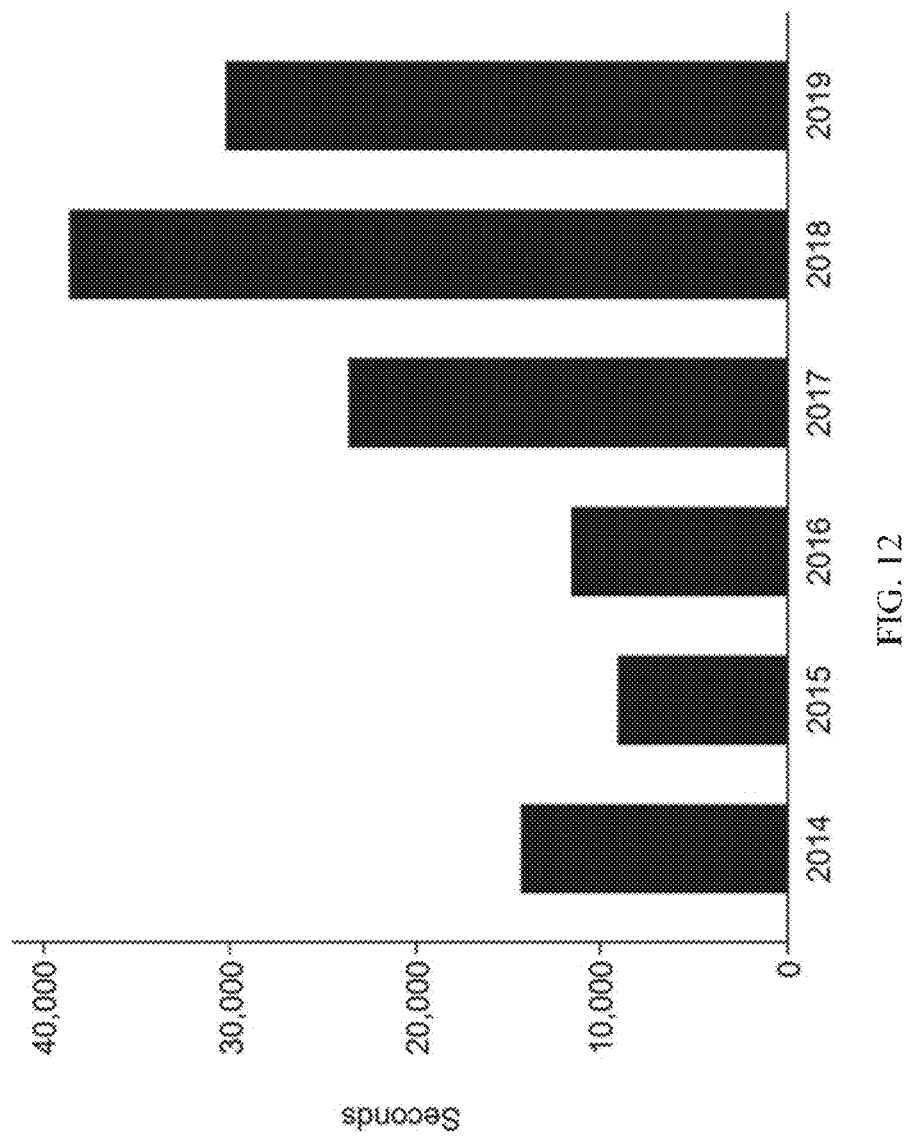
FIG. 12 is a graph of the number of violations of the system frequency operational limits in Great Britain, 2014-2019.
Figure 13:
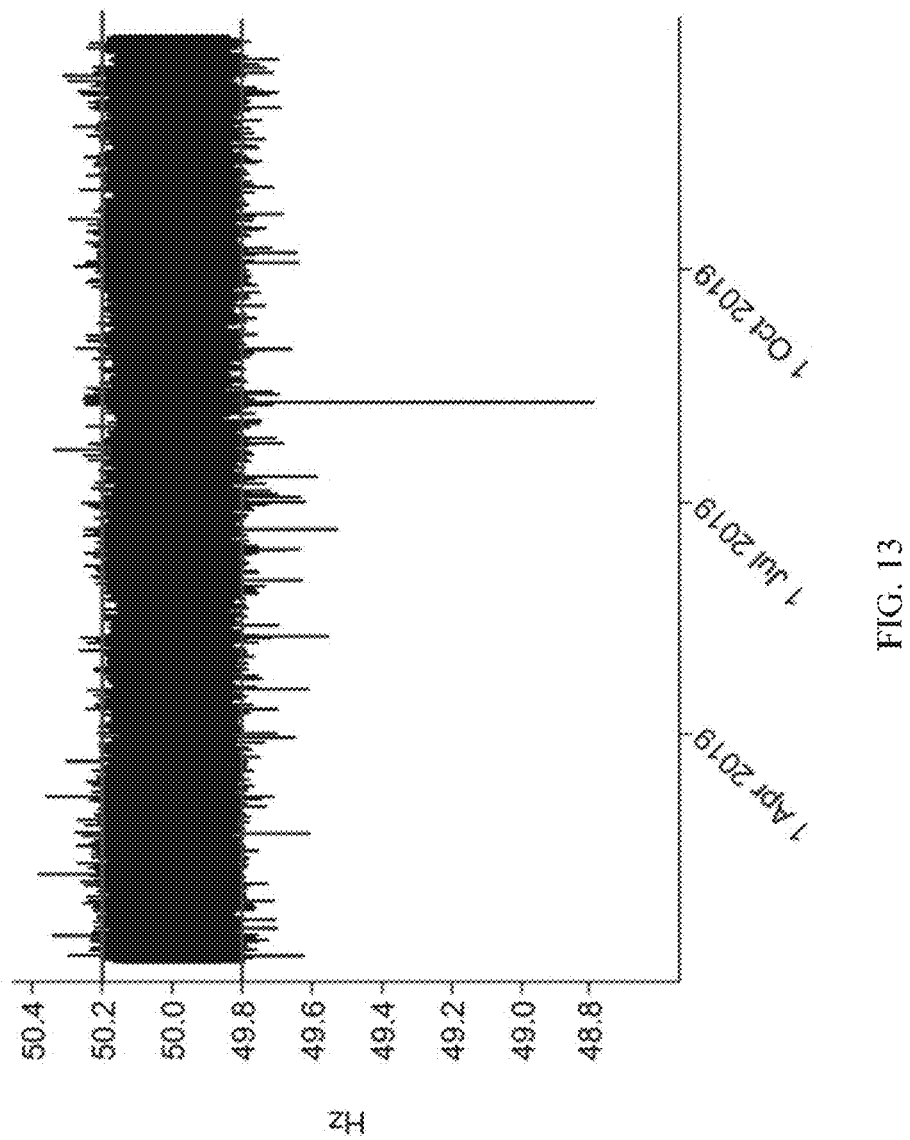
FIG. 13 is a graph of system frequency in Great Britain, 1 Jan.-31 Dec. 2019.

It is acknowledged that the Box-Jenkins philosophy of being parsimonious in the application of ARCH/ARMA terms may conflict with the goal of predictive accuracy. Beginning with Box and Jenkins, researchers are urged to keep their models parsimonious, i.e. use as few time-series operators as possible. The methodology presented here rejects this view when the inclusion of more time series operators 1) facilitates convergence, a major problem in time-series modeling and 2) leads to more accurate out-of sample predictions. The view here is that the goal of predictive accuracy should be the higher priority since predictive accuracy is enhanced when all the relevant ARCH/ARMA terms are modeled, i.e., when the residuals have the property of white noise. Thus, while researchers who analyze daily, monthly, or quarterly data may make use of ARMA(1,1), ARMA(2,2), or ARCH(1) specifications, the approach here will go substantially beyond this given the autocorrelations evidenced in FIGS. 9 and 10. Specifically, the time-series specification is ARMA(27, 51) with an ARCH(16) process for the conditional variance.

The first step of the estimation begins by testing whether it is appropriate to transform the dependent variable. Following Box-Cox (1964, p. 214), the dependent variable in Eq. (1) is transformed as follows:

$$TGLoad = \begin{cases} ((GLOAD + \lambda_2)^{\lambda_1} - 1)/\lambda_1; & \lambda_1 \neq 0 \\ \ln(GLOAD + \lambda_2); & \lambda_1 = 0 \end{cases} \quad (2)$$

where
$\lambda_1$ is a parameter estimated from the Box-Cox procedure and $\lambda_2$ is a value that ensures that the left-hand side of Eq. (1) is positive.

In this case, $\lambda_2$ was taken to be equal to zero. The null hypothesis of linearity in the dependent variable is supported if $\lambda_1=1$.

Inspection of Eqs. (1) and (2) reveals that the directions of the relationships between the dependent variable and the explanatory variables are preserved under the transformation. The value of the $\lambda_1$ was estimated with a goal of zero skewness in TGLoad.

The resulting estimated value of $\lambda_1$ is $-0.4501115$. The P-value is less than 0.001 and thus linearity in the modeling of the dependent variable is not supported.

To address the issue of linearity in the explanatory variables, reliance is placed on the multivariable fractional polynomial (MFP) methodology, a useful technique when one suspects that some or all relationships between the dependent variable and explanatory variables are non-linear (Royston and Sauerbrei, 2008). The MFP is initiated by estimating a model that is strictly linear in the explanatory variables. Subsequent estimations cycle through a battery of nonlinear transformations of the explanatory variables (e.g., cube roots, square roots, squares, etc.) until the model that best predicts the dependent variable is found. In the present case, the MFP results provided support for specifying some of the explanatory variables with powers other than unity. The transformed structural equation is given by:

$$\begin{aligned}
TGLoad = {} & \text{Constant} + \alpha_1 FT^3 + \alpha_2 FDP^{-2} + \alpha_3 \ln(FH) + \\
& \alpha_4 FV + \alpha_5 FP^2 + \alpha_6 FWS + \alpha_7 PRECIP + \alpha_8 (SNOW+1)^{-1} + \\
& \alpha_9 HCC + \alpha_{10} MCC + \alpha_{11} LCC^{1/2} + \alpha_{12} RAD + \alpha_{13} SLP + \\
& \alpha_{14} SUN + \alpha_{15} Pratio + \alpha_{16} \ln(FLoad) + \alpha_{17} \ln(Fload^*FT) + \\
& \alpha_{18}(Fload^*FH) + \alpha_{19}(Fload^*FT^*FH)^{1/2} + \alpha_{20}(Fload^*HCC) + \\
& \alpha_{21}(Fload^*MCC) + \alpha_{22}(Fload^*LCC) + \alpha_{23} \ln(Fload^*FP+1) + \\
& \alpha_{24}(Fload^*PRECIP) + \alpha_{25} \ln(Fload^*SNOW+1) + \\
& \alpha_{26}(Fload^*SLP)^2 + \alpha_{27}(Fload^*SLP^*FP) + \alpha_{28}(Fload^*SUN) + \\
& \alpha_{29}(Fload^*RAD)^{1/2} + \sum_{i=2}^{24} \phi_i H_i + \sum_{i=2}^{7} \beta_i Weekday_i + \sum_{i=2}^{73} \gamma_i Season_i
\end{aligned} \quad (3)$$

As discussed above, the time-series issues in the least-squares residuals are addressed in the second phase of the estimation procedure using ARCH/ARMA methods. Specifically, step two of the estimation is accomplished by first making use of an ARCH model. This method is useful in modeling times series data that exhibit time-varying volatility, i.e., periods of turbulence followed at some point by periods of relative calm. The second step in the modeling also makes use of an autoregressive-moving-average with exogenous inputs model specification (ARMAX), with the transformed explanatory variables from the first step (e.g., FDP) included as the exogenous inputs, and where the disturbance terms are presumed to follow an autoregressive moving-average (ARMA) specification. With respect to the modeling of the ARCH process, the specific lags modeled are 1, 2, 24, 48, 72, 96, 120, 144, 168, 192, 216, 240, 264, 288, 312, and 336. These lag lengths were chosen based on the observed diurnal pattern in the load autocorrelations reported in FIG. 19, as well as inspection of the least-squares residuals.

The conditional variance is modeled as a function of a series of binary variables representing the hour of the day, the day of the week, the season of the year, as well as the following variables:

$\sqrt{FLoad}$, $\sqrt{Pratio}$, $\sqrt{FT}$, $\sqrt{FH}$, $\sqrt{FDP}$, $\sqrt{FP}$, $\sqrt{FV}$, $\sqrt{RAD}$, $\sqrt{SLP}$, $\sqrt{SUN}$, $\sqrt{HCC}$, $\sqrt{MCC}$, $\sqrt{LCC}$, $\sqrt{PRECIP}$, and $\sqrt{SNOW}$.

To test whether prediction accuracy could be enhanced by modeling the expected value of the dependent variable on the conditional variance, an ARCH-in-Means specification was modeled for lags 1 and 2.

For the AR(p) process, the modeled lag lengths are p=1 through 4, 24, 48, 72, 96, 120, 144, 168, 191, 192, 216, 240, 264, 288, 312, 336, 360, 384, 480, 503, 504, 528, 672, and 673. The second portion of the ARMA component represents the moving-average (MA) nature of the disturbance terms. For the MA(q) process, the modeled lag lengths are q=1 through 24, 48, 72, 96, 144, 167, 168, 169, 191, 192, 216, 240, 264, 288, 312, 335, 336, 337, 360, 384, 480, 503, 504, 528, 648, 671, 672, and 673.

Eq. (3) was estimated under the assumption that the error distribution corresponds to a Student's t distribution, which allows for greater kurtosis than the Gaussian distribution. Specifically, the kurtosis accommodated by this distribution over the Gaussian level of three equals $6/(v-4)$, for $v>4$, where v is the distribution's "shape" parameter (Harvey, 2013, p. 20). The estimation yielded an estimate of v of approximately 7. Thus, the kurtosis in excess of the Gaussian level of three accommodated by the distribution equals $6/(7-4)$ or two.

Estimation results for the structural parameters exclusive of the binary variables for the hour of the day, day of the week, and season of the year are presented in Table 1. Eighteen of the 30 structural explanatory variables are statistically significant. Consistent with the hypothesis that the day-ahead market is informationally efficient, the coefficient corresponding to Pratio is positive and statistically significant. Sixteen of the forecasted/simulated metrological variables either represented in isolation or interacted with forecasted load, are statistically significant. For example, FT, FDP, FH, FP PRECIP, RAD, and SLP are all statistically significant. In contrast, the cloud cover variables are insignificant. The challenge of accurately simulating cloud cover is a possible reason for this.

Concerning the binary variables that are not reported (but available upon request), 30 of the 72 seasonal variables are statistically significant, 23 of the 23 hour-of-the-day variables are statistically significant, and 3 of the six variables reflecting the day of the week are statistically significant. Interestingly, the seasonality variables are all statistically significant over the period 10 June through 22 September and then again over the period 2 November through 16 December. Interestingly, the binary variables representing the day of the week are only significant for Friday, Saturday, and Sunday.

Regarding the time-series terms, 10 of the 27 AR terms, 36 of the 51 MA terms, 8 of the 16 ARCH terms, and 41 of the 80 conditional variance terms are statistically significant. The two ARCH-in-Means terms were both statistically insignificant. These time-series estimates are unreported but available upon request. An Augmented Dickey-Fuller test of the standardized residuals rejected the null hypothesis of a unit root in the residual error term with a P-value of less than 0.0001.

The model's explanatory power is equivalent to an $R^2$ of 0.7700 when based exclusively on the model's structural parameters but increases dramatically to 0.9992 when the ARCH/ARMA terms are included.

TABLE 1

Estimation Results

| Variable | Estimated Coefficient | Robust Standard Error | T Statistic | P-Value |
|---|---|---|---|---|
| Constant | 2.86 | 0.000306 | 9324.45 | <0.001 |
| $FT^3$ | 1.91E-09 | 1.33E-11 | 143.04 | <0.001 |
| $FDP^{-2}$ | -84.97 | 30.67441 | -2.77 | 0.006 |
| Ln(FH) | -3.13E-03 | 0.000151 | -20.66 | <0.001 |
| FV | -3.03E-07 | 3.92E-07 | -0.77 | 0.439 |
| $FP^2$ | 7.20E-09 | 3.59E-09 | 2.01 | 0.045 |
| FWS | 8.73E-07 | 8.49E-07 | 1.03 | 0.304 |
| PRECIP | 3.47E-05 | 1.68E-05 | 2.07 | 0.039 |
| $(SNOW+1)^{-1}$ | 1.63E-06 | 1.54E-06 | 1.05 | 0.292 |
| HCC | 2.62E-08 | 1.58E-07 | 0.17 | 0.868 |
| MCC | -2.03E-07 | 1.57E-07 | -1.29 | 0.196 |
| $LCC^{1/2}$ | 9.89E-07 | 7.07E-07 | 1.4 | 0.161 |
| RAD | 1.22E-07 | 3.70E-08 | 3.31 | 0.001 |
| SLP | 2.48E-06 | 4.28E-07 | 5.79 | <0.001 |
| SUN | -1.43E-06 | 3.63E-07 | -3.95 | <0.001 |
| Pratio | 4.76E-05 | 5.25E-06 | 9.08 | <0.001 |
| Ln(FLoad) | 1.40E-01 | 4.85E-05 | 2893.26 | <0.001 |
| Ln(FLoad*FT) | -1.35E-01 | 2.26E-05 | -6004.12 | <0.001 |
| Fload*FH | -9.93E-09 | 5.45E-10 | -18.24 | <0.001 |
| $(Fload*FT*FH)^{1/2}$ | 1.35E-06 | 6.52E-08 | 20.71 | <0.001 |
| Fload*HCC | -1.78E-12 | 2.51E-11 | -0.07 | 0.944 |
| Fload*MCC | 2.89E-11 | 2.51E-11 | 1.15 | 0.251 |
| Fload*LCC | -1.80E-11 | 1.11E-11 | -1.63 | 0.104 |
| Ln(Fload*FP+1) | 1.08E-07 | 3.34E-07 | 0.32 | 0.746 |
| Fload*PRECIP | -5.17E-09 | 2.63E-09 | -1.97 | 0.049 |
| Ln(Fload*SNOW+1) | 1.46E-05 | 1.24E-05 | 1.18 | 0.239 |
| $(Fload*SLP)^2$ | -4.44E-17 | 2.68E-18 | -16.57 | <0.001 |
| Fload*SLP*FP | -1.01E-13 | 5.75E-14 | -1.75 | 0.080 |
| Fload*SUN | 1.86E-10 | 5.56E-11 | 3.34 | 0.001 |
| $(Fload*RAD)^{1/2}$ | -4.88E-08 | 1.65E-08 | -2.96 | 0.003 |
| Number of observations | 17,324 | | | |
| R-Squared: based on all the estimated parameters including the ARCH/ARMA terms | 0.9992 | | | |
| R-Squared: based on the structural parameters exclusively | 0.7700 | | | |

Figure 20:
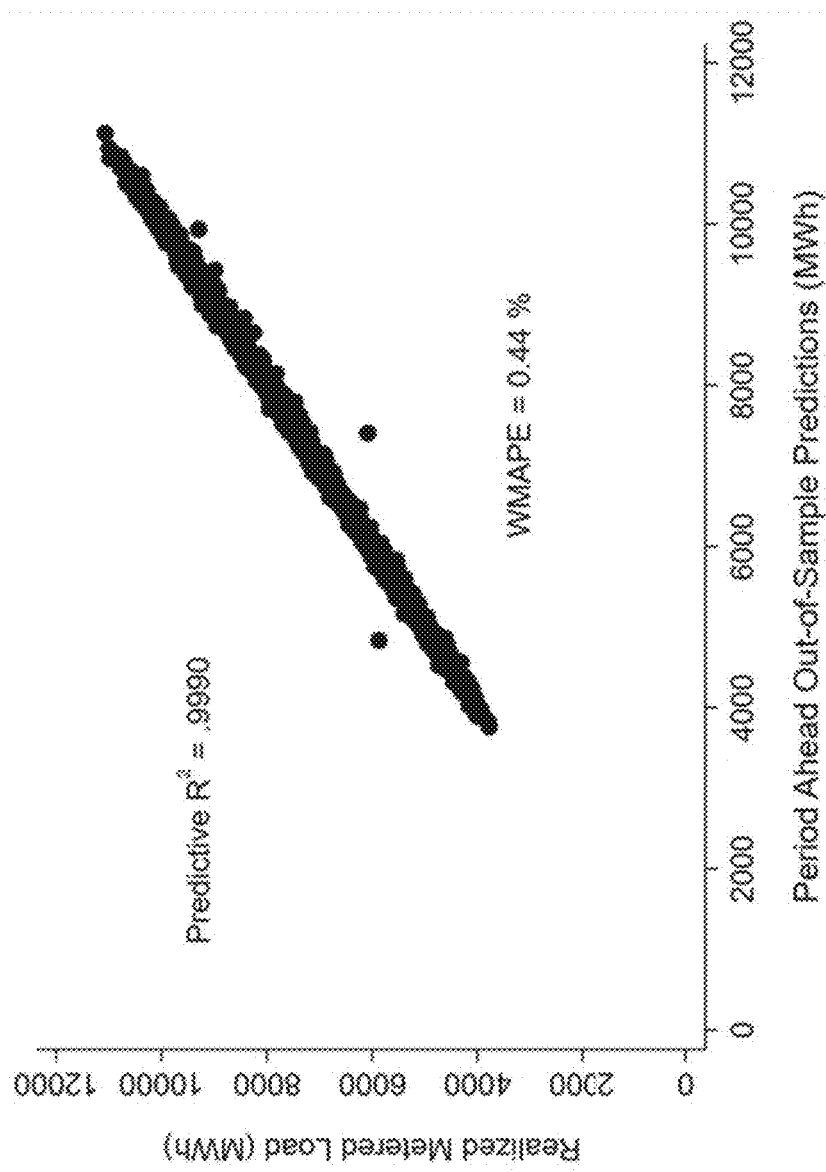
FIG. 20 is a graph of the time-series model's out-of-sample period t-1 predictions vs. actual load, 1 Jan. 2017-31 Dec. 2018 according to an exemplary embodiment of the present invention.

Continuing with the Example, this section presents an out-of-sample evaluation of the model over the period 1 Jan. 2017 through 31 Dec. 2018. Over the 17,400 hours out-of-sample evaluation period, the predictive $R^2$ equaled 0.9990, while the WMAPE equals 0.44%. Indicative of these quantitative measures of accuracy, there is a high degree of visual correspondence between the predicted load based on the time-series model and the actual load, as shown in FIG. 20 which is a graph of the time-series model's out-of-sample period t-1 predictions vs. actual load, 1 Jan. 2017-31 Dec. 2018.

Figure 21:
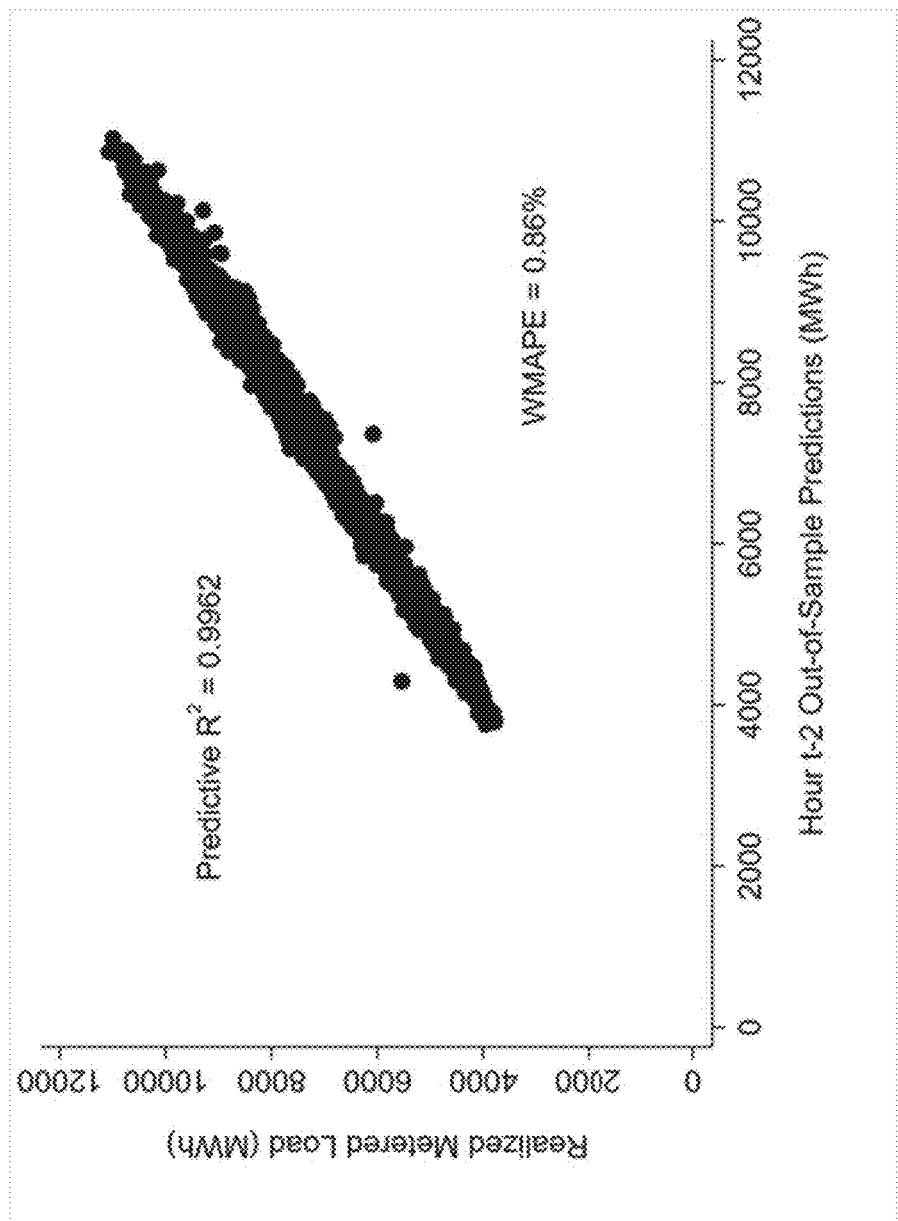
FIG. 21 is a graph of the time-series model's out-of-sample period t-2 predictions vs. actual load, 1 Jan. 2017-31 Dec. 2018, according to an exemplary embodiment of the present invention.

Period-ahead predictions, however, may be of limited value to the system operator as they are available only at the end of the previous period (period t-1). Accordingly, predictions were calculated that could be made available to a system operator one full period before real-time, i.e., at the end of period t-2. In this case, the out-of-sample WMAPE is 0.86%, as shown in FIG. 21 which is a graph of the time-series model's out-of-sample period t-2 predictions vs. actual load, 1 Jan. 2017-31 Dec. 2018.

Figure 22:
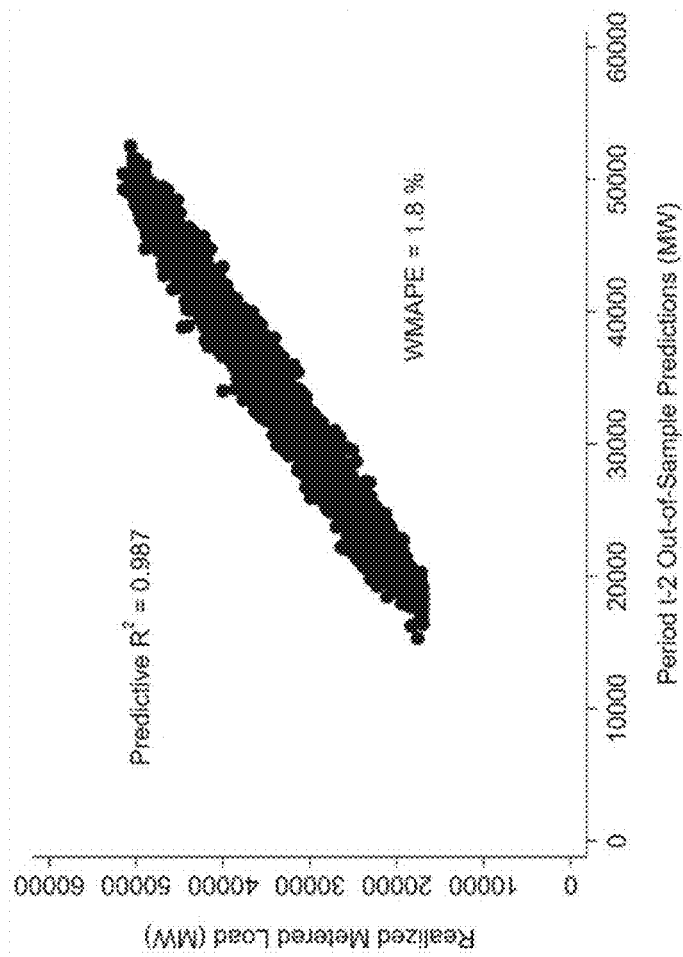
FIG. 22 is a graph of the time-series model's out-of-sample period t-2 predictions vs. actual load in Great Britain according to an exemplary embodiment of the present invention.

Further, the usefulness of this modeling approach is not limited to New York City. For example, a preliminary application of the method to Great Britain yields period t-2 out-of-sample predictions with a WMAPE of 1.8% (as shown in FIG. 22) which is substantially more accurate than the day-ahead forecast that has a WMAPE of 6.76%. The processing of recently downloaded data on solar and wind generation in Great Britain is expected to widen this deferential in accuracy.

**************

Figure 23:
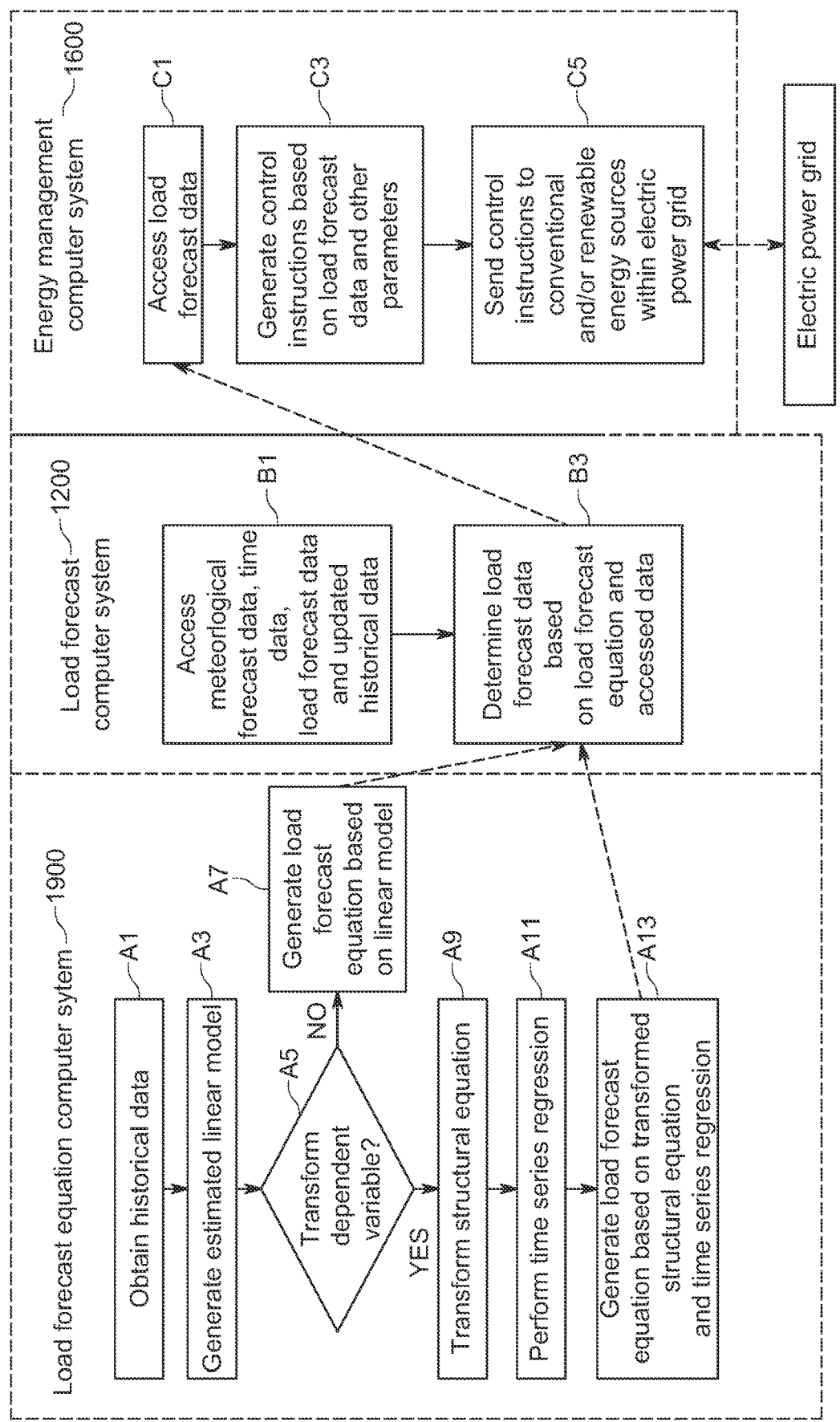
FIG. 23 is a flowchart showing a process for controlling an electric power grid based on refined electric power grid load forecasts according to an exemplary embodiment of the present invention.

FIG. 23 is a flowchart showing a process for controlling an electric power grid based on refined electric power grid load forecasts according to an exemplary embodiment of the present invention, where the forecasts are obtained through interactions between a load forecast equation computer system 1900, the load forecast computer system 1200, the energy management computer system 1600 and the electric power grid 2000 and use of historic and forecasted data (e.g., historic/forecasted meteorological data, historic/forecasted renewal energy generation data and corresponding historic/forecasted time data), resulting in improved efficiency of the electric power grid 2000 in terms of loading and generation of energy, and consequently improving economic variables and environmental effects associated with the overall grid system. For example, as a result of the refined load forecasts, the process shown in FIG. 23 may address technological issues associated with integration of renewable energy resources, such as, for example, solar energy and wind energy, with conventional energy resources within the power grid so as to allow for improvements in balancing of supply and demand of electricity. In exemplary embodiments, it should be appreciated that the load forecast equation computer system 1900 may be integrated into the load forecast computer system 1200 as, for example, a hardware or software component, or may be a separate computer system connected to the other computer systems either directly or through a network.

Turning now to the process flow, in steps A1 and A3, the load forecast equation computer system 1900 estimates a linear structural equation of electricity load based on obtained historical load data. Such data may be obtained over any period of time, such as, for example, a period of days, months or years, to name a few, and reflects the actual load data as measured over the selected time period. In step AS, a Box-Cox analysis is performed on the structural equation that includes the historical load data as a dependent variable. In an exemplary embodiment, the structural equation has the same general form as that show in equation (1), although in this step the historical data is used as inputs. This analysis determines whether the dependent variable should be transformed (e.g., $Load^{1/2}$). In exemplary embodiments, the dependent variable in most cases will require a non-linear transformation.

In step A7, the specification of the dependent variable in the analysis is determined (linear or nonlinear) using the Box-Cox method.

In step A9, regardless of the functional form of the dependent variable, an multivariable fractional polynomial (MFP) analysis of the explanatory variables is conducted. In exemplary embodiments, the likely result is a structural equation with a transformed measure of grid supplied load as a dependent variable and a series of explanatory variables that may have a nonlinear specification (e.g., Air Density squared).

Next, in step A11, using the structural equation, a time-series analysis is conducted. In exemplary embodiments, it is expected that the time-series analysis will require numerous autoregressive (AR) and moving-average (MA) terms so as to capture the autoregressive nature of grid supplied electricity consumption. This may violate the notion of parsimony, but, without being bound by theory, may be necessary to achieve accurate out-of-sample predictions. To achieve model convergence, it is also expected that the autoregressive conditional heteroscedastic (ARCH) nature of the error terms will need to be modeled.

In step A13, the load forecast equation computer system 1900 generates the load prediction equation based on the time series analysis of the transformed structural equation. In the likely case where the historical load data has been transformed, this will require that the predicted transformed value be untransformed.

The process will then continue to step B1, where the load forecast computer system 1200 may access meteorological forecast data, time data, renewable energy forecast data (as obtained from the energy management computer system 1600) and updated historical data, so that, as shown in step B3, such data may be applied to the load prediction equation determined in steps A13 to determine revised load predictions.

Next, in step C1, the energy management computer system 1600 may access the load forecast data determined in step B3, and use the forecast as well as other control parameters in step C3 to generate control instructions for the various energy sources within the electric power grid. In step C5, the control instructions may be sent to various conventional and/or renewable energy sources within the electric power grid.

Now that exemplary embodiments of the present disclosure have been shown and described in detail, various modifications and improvements thereon will become readily apparent to those skilled in the art. As can be appreciated, the system and methods described herein are exemplary, and various combinations of variables may be used in solar energy and wind energy generation forecast equations. In exemplary embodiments, forecast equations using this modeling approach may vary across different electricity markets and may, for example, include different variables, coefficients, and/or exponents. For example, in systems where distributed generation includes wind energy generation, variables such as forecasted wind density (calculated based on forecasted wind speeds cubed and forecasted air density) might be important drivers of the revised load forecasts.

REFERENCES

Denholm P., M. O'Connell, G. Brinkman, and J. Jorgenson (2015) Overgeneration from Solar Energy in California: A Field Guide to the Duck Chart, National Renewable Energy Laboratory, NREL/TP-6A20-65023. Available at https://www.nrel.gov/docs/fy16osti/65023.pdf Box, G. E. P., & Cox, D. R. (1964). An analysis of transformations. Journal of the Royal Statistical Society, Series B, 26, 211-252.

Box, G. E. P., Hunter, J. S. & Hunter, W. G. (2005), Statistics for Experimenters (2nd ed.), John Wiley & Sons.

California ISO (2018). Briefing on renewables and recent grid operations https://www.caiso.com/Documents/Briefing_Renewables_RecentGridOperations-Presentation-Mar2018.pdf Elia (2017). Forecast and Actual-PV Power Generation. Available at https://www.elia.be/~/media/files/Elia/Grid-data/Power%20Generation/SolarForecasting_EN.pdf Federal Energy Regulatory Commission (2014) Uplift in RTO and ISO Markets. Available at: https://www.ferc.gov/legal/staff-reports/2014/08-13-14-uplift.pdf (Accessed 30 Jun. 2019).

Forbes K. F. and E. M. Zampelli. (2019). Wind energy, the price of carbon allowances, and $CO_2$ emissions: Evidence from Ireland, Energy Policy, 133

Forbes, K. F. and E. M Zampelli (2014). Do Day-Ahead Electricity Prices Reflect Economic Fundamentals?: Evidence from the California ISO, The Energy Journal, 35 (3): pp 129-144

Harvey, A. C. (2013). Dynamic models for volatility and heavy tails: With applications to financial and economic time series. New York: Cambridge University Press. https://doi.org/10.1017/CBO9781139540933

Gagnon P., R. Margolis, J. Melius, C. Phillips, and R. Elmore (2016). *Rooftop Solar Photovoltaic Technical Potential in the United States: A Detailed Assessment*, National Renewable Energy Laboratory Technical Report (NREL/TP-6A20-65298).

NERC (2017) Distributed Energy Resources Task Force Report. Available at: https://www.nerc.com/comm/Other/essntlrlbltysrvcstskfrcDL/Distributed Energy? Resources Report.pdf (Accessed 30 Jun. 2019).

New York Independent System Operator (2016). Solar Impact on Grid Operations—An Initial Assessment. Available at: https://www.nyiso.con/documents/20142/1394495/Solar%20Integration%20Study%20Report%20Final%20063016.pdf/8fcbce3c-7be3-6b01-54d3-0887b9633969 (Accessed 30 Jun. 2019).

New York Independent System Operator (2019). Power Trends 2019: Reliability and the Greener Grid. Available at: https://www.nyiso.com/documents/20142/2223020/2019-Power-Trends-Report.pdf/0e8d65ee-820c-a718-452c-6c59b2d4818b (Accessed 30 Jun. 2019).

New York Independent System Operator (2019). NYISO Performance Metrics: Q4 2018. Available at https://www.nviso.com/documents/20142/2244158/Q4-Ouarterly-Metrics-Report.pdf/9d563013-52ce-8854-7a9c-33744d2d9da9 (Accessed 30 Jun. 2019).

Potomac Economics, (2017), 2016 State of the Market Report for the New York ISO Markets Available at https://www.potomaceconomics.com/document-library/?filtermarket=NYISO (Accessed 30 Jun. 2019).

Potomac Economics, (2019), 2018 State of the Market Report for the New York ISO Markets Available at https://www.potomaceconomics.com/document-library/?filtermarket=NYISO (Accessed 30 Jun. 2019).

Royston, P., and W. Sauerbrei. (2008). Wiley series in probability and statistics. In Multivariable model-building: A pragmatic approach to regression analysis based on fractional polynomials for modelling continuous variables. Chichester, UK: John Wiley.

Shinkawa, T. (2018) Electricity System and Market in Japan, Electricity and Gas Market Surveillance Commission. Available at https://www.emsc.meti.go.jp/english/info/public/pdf/180122.pdf (Accessed 30 Jun. 2019).

The invention claimed is:

1. A method comprising:
   (A) accessing, by one or more computers, one or more electronic databases, stored on one or more computer readable media, the one or more databases comprising:
      (i) forecasted meteorological conditions data associated with a geographical area encompassing an electric power grid;
      (ii) forecasted energy load data associated with energy load on the electric power grid;
      (iii) time data comprising at least one of time of day data or season data associated with the electric power grid;

(iv) historical data comprising historical load data, historical forecasted meteorological conditions data, historical forecasted wind and solar energy generated by distributed energy resources made available to the electric power grid, and historical time data corresponding to the historical forecasted meteorological conditions data;

(B) calculating, by the one or more computers, a revised load forecast for the electric power grid based on the forecasted meteorological conditions data, forecasted wind and solar energy generation, the forecasted energy load data, the time data and time-series variables determined based on an analysis of the historical data, wherein the calculating step comprises:

(i) estimating, by the one or more computers, a structural equation of electricity load on the electric power grid based on the historical data, including the historical forecasted wind and solar energy generated by distributed energy resources made available to the electric power grid, where the electricity load is a dependent variable of the structural equation;

(ii) analyzing, by the one or more computers, the structural equation to determine whether the electricity load as the dependent variable requires transformation;

(iii) performing, by the one or more computers, a multivariable fractional polynomial analysis of explanatory variables in the structural equation with the dependent variable transformed or not transformed as determined in step (B)(ii) to determine whether each of the explanatory variables have a linear or non-linear specification;

(iv) performing, by the one or more computers, a time series analysis of the structural equation with the dependent variable transformed or not transformed as determined in step (B)(ii) and with each of the explanatory variables having a linear or non-linear specification as determined in step (B)(iii), wherein the time series analysis comprises use of an autoregressive-moving average (ARMA) model represented by ARMA(p,q), where p is a number of lag lengths for the auto-regressive component of the ARMA model and q is a number of lag lengths for the moving average component of the ARMA model, and values for p and q are 100 or more;

(v) generating, by the one or more computers, a load prediction equation based on the time series analysis of the structural equation with the dependent variables transformed or not transformed as determined in step (B)(ii) and with each of the explanatory variables having a linear or non-linear specification as determined in step (B)(iii); and (vi) calculating, by the one or more computers, a revised forecast of energy load by inputting the forecasted meteorological conditions data, the forecasted load energy data, the forecasted wind and solar energy generated by distributed energy resources made available to the electric power grid, and the time data to the load prediction equation;

C) providing, by the one or more computers, to an energy management computer system, the revised load forecast; and D) adjusting levels of generation of conventional energy using the electric power grid based on the provided revised load forecast.

2. The method of claim 1, wherein the forecasted meteorological conditions comprise one or more of the following: forecasted temperature; forecasted wind speed; forecasted humidity; forecasted solar radiation; forecasted air pressure; forecasted air density, forecasted wind density; forecasted dewpoint; forecasted visibility; forecasted probability of precipitation; and forecasted sky conditions.

3. The method of claim 1, wherein the load prediction equation is a combination of the structural equation with the dependent variable transformed or not transformed as determined in step (B)(ii), the structural equation with each of the explanatory variables having a linear or non-linear specification as determined in step (B)(iii) and time series variables as determined by the time series analysis as performed in step (B)(iv).

4. The method of claim 1, wherein step (B)(ii) comprises a Box-Cox analysis.

5. The method of claim 1, wherein the explanatory variables comprise one or more coefficients and exponents.

6. A system comprising:
one or more data processing apparatus;
a computer-readable medium coupled to the one or more data processing apparatus having instructions stored thereon which, when executed by the one or more data processing apparatus, cause the one or more data apparatus to perform a method comprising:

(A) accessing, by one or more computers, one or more electronic databases, stored on one or more computer readable media, the one or more databases comprising:

(i) forecasted meteorological conditions data associated with a geographical area encompassing an electric power grid;

(ii) forecasted energy load data associated with energy load on the electric power grid;

(iii) time data comprising at least one of time of day data or season data associated with the electric power grid;

(iv) historical data comprising historical load data, historical forecasted meteorological conditions data, historical forecasted wind and solar energy generated by distributed energy resources made available to the electric power grid, and historical time data corresponding to the historical forecasted meteorological conditions data;

(B) calculating, by the one or more computers, a revised load forecast for the electric power grid based on the forecasted meteorological conditions data, forecasted wind and solar energy generation, the forecasted energy load data, the time data and time-series variables determined based on an analysis of the historical data, wherein the calculating step comprises:

(i) estimating, by the one or more computers, a structural equation of electricity load on the electric power grid based on the historical data, including the historical forecasted wind and solar energy generated by distributed energy resources made available to the electric power grid, where the electricity load is a dependent variable of the structural equation;

(ii) analyzing, by the one or more computers, the structural equation to determine whether the electricity load as the dependent variable requires transformation;

(iii) performing, by the one or more computers, a multivariable fractional polynomial analysis of explanatory variables in the structural equation with the dependent variable transformed or not transformed as determined in step (B)(ii) to determine whether each of the explanatory variables have a linear or non-linear specification;

(iv) performing, by the one or more computers, a time series analysis of the structural equation with the dependent variable transformed or not transformed as determined in step (B)(ii) and with each of the explanatory variables having a linear or non-linear specification as determined in step (B)(iii), wherein the time series analysis comprises use of an autoregressive-moving average (ARMA) model represented by ARMA(p,q), where p is a number of lag lengths for the auto-regressive component of the ARMA model and q is a number of lag lengths for the moving average component of the ARMA model, and values for p and q are 100 or more;

(v) generating, by the one or more computers, a load prediction equation based on the time series analysis of the structural equation with the dependent variables transformed or not transformed as determined in step (B)(ii) and with each of the explanatory variables having a linear or non-linear specification as determined in step (B)(iii); and (vi) calculating, by the one or more computers, a revised forecast of energy load by inputting the forecasted meteorological conditions data, the forecasted load energy data, the forecasted wind and solar energy generated by distributed energy resources made available to the electric power grid, and the time data to the load prediction equation;

C) providing, by the one or more computers, to an energy management computer system, the revised load forecast; and D) adjusting levels of generation of conventional energy using the electric power grid based on the provided revised load forecast.

7. The system of claim 6, wherein the forecasted meteorological conditions comprise one or more of the following: forecasted temperature; forecasted wind speed; forecasted humidity; forecasted solar radiation; forecasted air pressure; forecasted air density, forecasted wind density; forecasted dewpoint; forecasted visibility; forecasted probability of precipitation; and forecasted sky conditions.

8. The system of claim 6, wherein the load prediction equation is a combination of the structural equation with the dependent variable transformed or not transformed as determined in step (B)(ii), the structural equation with each of the explanatory variables having a linear or non-linear specification as determined in step (B)(iii) and time series variables as determined by the time series analysis as performed in step (B)(v).

9. The system of claim 6, wherein step (B)(ii) comprises a Box-Cox analysis.

10. The system of claim 6, wherein the explanatory variables comprise one or more coefficients and exponents.

* * * * *